United States Patent
Dal Bosco

(10) Patent No.: US 11,477,147 B2
(45) Date of Patent: Oct. 18, 2022

(54) MESSAGING SYSTEM WITH CUSTOMIZED GRAPHIC OR AUDIO ELEMENTS

(71) Applicants: Social Media Emotions S.r.l., Vicenza (IT); Nicola Dal Bosco, Vicenza (IT)

(72) Inventor: Nicola Dal Bosco, Vicenza (IT)

(*) Notice: Subject to any disclaimer, the term of this patent is extended or adjusted under 35 U.S.C. 154(b) by 0 days.

(21) Appl. No.: 17/421,865

(22) PCT Filed: Jan. 10, 2020

(86) PCT No.: PCT/IB2020/050173
§ 371 (c)(1),
(2) Date: Jul. 9, 2021

(87) PCT Pub. No.: WO2020/144634
PCT Pub. Date: Jul. 16, 2020

(65) Prior Publication Data
US 2022/0109647 A1  Apr. 7, 2022

(30) Foreign Application Priority Data

Jan. 11, 2019 (IT) .................. 102019000000457

(51) Int. Cl.
| | |
|---|---|
| G06F 15/16 | (2006.01) |
| H04L 51/08 | (2022.01) |
| G06F 16/41 | (2019.01) |
| H04L 51/066 | (2022.01) |
| H04L 51/42 | (2022.01) |

(52) U.S. Cl.
CPC .............. *H04L 51/08* (2013.01); *G06F 16/41* (2019.01); *H04L 51/066* (2013.01); *H04L 51/42* (2022.05)

(58) Field of Classification Search
CPC ......... H04L 51/08; H04L 51/10; H04L 51/18; H04L 51/22; H04L 51/06; H04L 51/063; H04L 51/066
See application file for complete search history.

(56) References Cited

U.S. PATENT DOCUMENTS

| | | | |
|---|---|---|---|
| 9,143,534 B1* | 9/2015 | Kelliher | H04W 4/14 |
| 9,699,299 B1* | 7/2017 | Pereira | H04M 1/72436 |
| 2007/0101005 A1* | 5/2007 | Shim | G06Q 10/107 |
| | | | 715/239 |

(Continued)

FOREIGN PATENT DOCUMENTS

KR       20050020386        3/2005

*Primary Examiner* — Johnny B Aguiar
(74) *Attorney, Agent, or Firm* — Themis Law

(57) ABSTRACT

A messaging system includes sender and receiver devices, and a central unit communicating therewith. The central unit communicates with a database containing first data on graphic and audio elements, which are managed by the messaging system and have first dimensions and/or degrees of detail, and software that creates, starting from the first graphic and audio elements, corresponding second graphic and audio elements of smaller dimensions and/or degrees of detail. A first software module loaded in the sender and/or receiver devices downloads one or more of the second graphic and audio elements from the central unit and uses them inside the messaging system, and provides on a display of the messaging device a first screen with a message or exchange of messages and the one or more second graphic and audio elements, which occupy an area selectable by touch or by clicking.

16 Claims, 12 Drawing Sheets

(56) References Cited

U.S. PATENT DOCUMENTS

Figure 1:
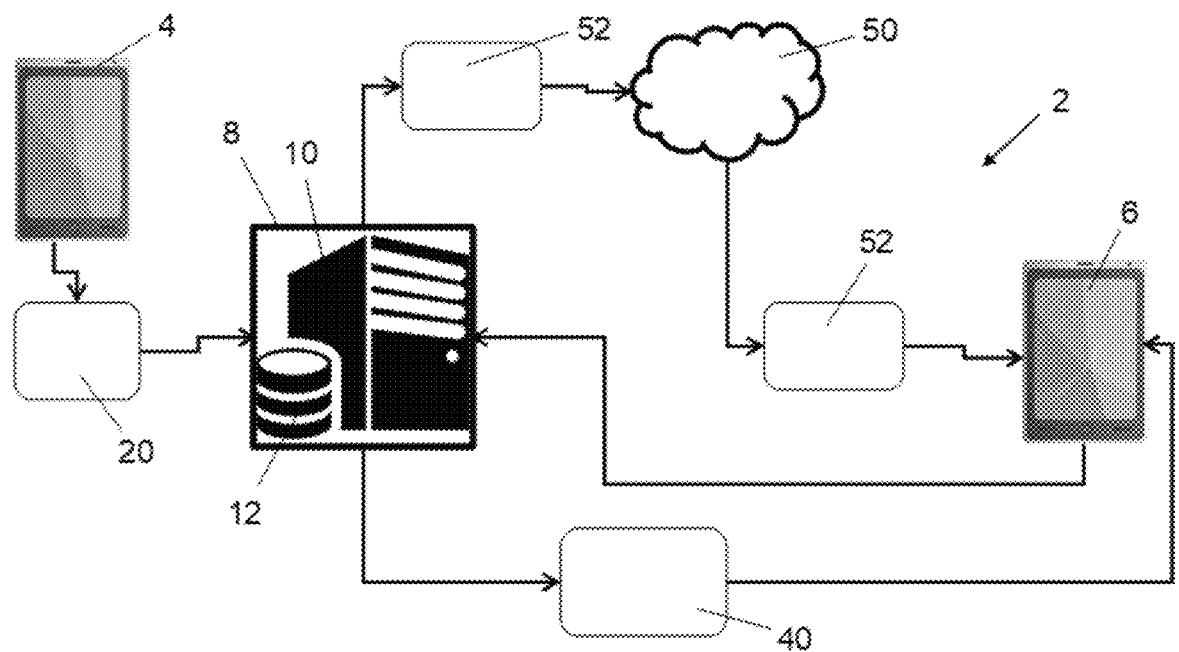

| | | | | |
|---|---|---|---|---|
| 2008/0163355 | A1* | 7/2008 | Chu | H04L 67/28 |
| | | | | 726/12 |
| 2011/0066687 | A1* | 3/2011 | Chen | H04L 51/066 |
| | | | | 709/206 |
| 2012/0162350 | A1* | 6/2012 | Lee | H04M 1/7243 |
| | | | | 348/14.03 |
| 2012/0226760 | A1* | 9/2012 | Lewis | H04L 51/08 |
| | | | | 709/206 |
| 2018/0314409 | A1* | 11/2018 | Adilipour | H04L 51/10 |
| 2019/0306098 | A1* | 10/2019 | Jang | H04L 51/10 |

* cited by examiner

MESSAGING SYSTEM WITH CUSTOMIZED GRAPHIC OR AUDIO ELEMENTS

The present invention relates to an improved messaging system, preferably instantaneous, and an improved method for managing graphic and/or audio elements in a messaging system.

Currently, in messaging systems, in particular instantaneous ones, emoticons are already widely used, which plan to use, within the text of the message itself, particular combinations of characters (letters, numbers, punctuation symbols, etc.) in order to create symbolic graphic representations to express a particular mood.

The so-called "emoji®" are also known, which instead are real images associated and connected to a certain encoding, generally of the Unicode type. To this end, emojis® must be supported by appropriate software capable of reading them, otherwise they cannot be displayed.

In this context, in the exchange of messages containing emoji®, it can happen that different images are associated with the same encoding between sender and receiver, thus causing an unwanted misunderstanding. Not only that, sometimes it happens that in the receiver's terminal a certain emoji® is not supported or there is no image associated with the encoding used by the sender, thus causing the display of an unpleasant space or white square.

WO2017/059524 describes a messaging system in which all users can use all the graphic elements (such as emoji®, stickers, memes) loaded in the system and, in particular, there is no prior authorization/authorization architecture and mechanism (as well as control of this authorization/enablement) for the use or insertion of the graphic elements within a message to be sent. In particular, in order to facilitate the viral diffusion of the graphic elements used in this system, when a message with a graphic element is received by the corresponding receiver device and, if necessary, is downloaded from the centralized library, this element can then be freely inserted by the receiver in a new message to be sent as a sender.

WO2014/100682 describes a messaging system in which, when a message with a graphic and/or audio element—which is not already present in the local library of the receiver device—is received by the corresponding receiving device, that graphic and/or audio element it is downloaded from the centralized library, present on the server, to the local library of the receiver device. Then, once it has been downloaded into the local library of the receiver device, this graphic and/or audio element can then be freely inserted by the receiver in a new message to be sent as a sender.

US2015/0327033 describes a messaging system in which to send a message containing graphic elements and in order to uniquely identify these graphic elements, zero-width Unicode sequences (ZW) are inserted within the message itself.

U.S. Pat. No. 9,699,299 describes a messaging system for sending messages containing graphic and/or audio elements associated with tags, which are intended to be typed—using the keyboard—by the sending user when preparing a message to be sent. Furthermore, in this messaging system, each tag can be associated with multiple graphic and/or audio elements. In particular, every time that during the preparation of a new message, the sending user enters a word corresponding to a certain tag, the software is configured to perform two queries, one directed to the local library loaded in the sender device and one directed to the remote memory loaded in the central server, and this in order to identify all the graphic and/or audio elements associated with this tag. Again, when a message with a graphic and/or audio element—which is not already present in the local library of the receiver device—is received by the corresponding receiver device, that graphic and/or audio element is downloaded from the centralized library, present on the server, in the local library of the receiver device. Therefore, once it has been downloaded into the local library of the receiver device, this graphic and/or audio element can then be freely inserted by the receiver in the preparation phase of a new message to be sent as a sender, always in any case according to the methods described above.

WO2015/122993 describes a messaging system in which the sender and the receiver can create, within their conversations, an animation in which the respective avatars of the sender and the receiver interact with each other. This system is configured so that, within the message, the avatars are not identified by a unique code but by the combination of values to be associated with a series of their attributes and, moreover, a message is also inserted within the message. code (ACC) indicating the type of animation to be created between the sender's avatar and the receiver's avatar. To correctly display the message, the software of the receiver device is configured to reconstruct and then display the animation of the respective avatars and to do this identifies the ACC code in the message so as to then recover the corresponding animation from a first database, as well as identify the individual attributes of the avatars—both of the sender and the receiver—so that you can reconstruct/assemble the avatars locally for use in the animation Furthermore, this messaging system is configured so that the animation on the sender's device display is created and displayed only after confirmation of receipt has been received from the receiver's device.

US 2007/0101005 describes a method for transferring emoticons between different communication devices. In particular, the method provides a conversion unit to identify and extract an emoticon from a corresponding database which is readable by the receiver device. For this purpose, the conversion unit is connected to an emoticon database in which a transcoding table of the emoticons managed by the sender device is stored in the emoticons managed by the receiver device.

KR20050020386 describes a system for sending images via MMS (Multimedia Message Service) between two mobile phones. Also, this system foresees the presence of a conversion unit which extracts from a database, where the contents in various formats or resolution are stored, the graphic content which is suitable to be displayed by the receiving device. In particular, for this purpose, the conversion unit is associated with a database in which the data relative to all the sending and receiving devices are stored, and this in order to extract the suitable content for each device.

The solutions of US 2007/0101005 and KR20050020386 are not fully satisfactory as they provide for the sending of graphic content only as MMS, thus causing limits on the size, format and/or type of content that can be transferred.

Furthermore, traditional instant messaging systems are not fully satisfactory since, in order to display graphic contents (both images and videos, and preferably emoji® or in general emoticon-style illustrations) inside and/or in line with the text of the message, these contents are necessarily and inevitably displayed in particularly reduced resolution and dimensions on the displays of portable devices, and this does not allow to fully appreciate the detailed and/or artistic aspects of the graphic content.

This is especially true in the case of emoji® (i.e. of symbols or illustrations stylized of an idea, a physical object, a concept and/or a mood) graphically elaborate and complex, which are increasingly requested by users, and which convey different and more in-depth contents than simple emoticons or traditional emojis®, such as those that represent a stylized "smiley face".

Furthermore, currently, on the one hand, users have little possibility of personalizing the graphic contents (and in particular emojis®) to be used in their messages and, at the same time, for the creators of new graphic contents, it is particularly difficult to advertise or make available to the public the content they created, while obtaining recognition (also financially) for their creations. In essence, there is an increasing need for creators of new content to have a platform on which to easily advertise and share their creations, generally rather elaborate, in order to allow users to be able to buy and/or download them for then be able to use them in messages.

The object of the present invention is to propose a messaging system which overcomes the aforementioned drawbacks present in the traditional technique.

Another object of the invention is to propose a messaging system that allows the user to use/insert customized graphics and/or audio elements within the text of the messages.

Another object of the invention is to propose a messaging system which allows the user to optimally display graphic elements which, within a message, are positioned in line with the text of the message itself.

Another object of the invention is to propose a messaging system that allows the user to view, within the same system, a graphic element in a sufficiently enlarged and detailed way to appreciate its creative elaboration.

Another object of the invention is to propose a messaging system which allows to visualize, within the same system, the graphic element in an enlarged way and so that this enlargement is automatically adapted to the size of the display of the device in which this element graph itself is displayed.

Another object of the invention is to propose a messaging system which allows to implement, within the same system, graphic and/or audio elements in a faster and more performing way than traditional solutions.

Another object of the invention is to propose a messaging system which allows to communicate to the user of the system itself a greater number of information regarding the graphic and/or audio element inserted in a message.

Another object of the invention is to propose a messaging system which, within the same system, allows a quick, simple and intuitive connection with a specific section of an IT platform, preferably with a section where it is possible to make the purchase and/or the downloading of graphic and/or audio elements for use in said messaging system.

Another object of the invention is to propose a messaging system that allows the user to customize the balloons (i.e. the frame that encloses the text) to be used in the messages, in particular in messages where graphic elements are conveyed inside the balloon and/or personalized audio.

Another object of the invention is to propose a messaging system that allows the user to customize the avatar (i.e. the graphic representation used by each user to identify himself when he communicates with other users, for example in a chat) to be used in messages, in particular in messages in which customized graphic and/or audio elements are conveyed inside the balloon.

Another object of the invention is to propose a messaging system which allows to transmit graphic and/or audio elements which are not necessarily present in the receiver's terminal.

Another object of the invention is to propose a messaging system which ensures the correct display of the same graphic element by both the sender and the receiver of the message.

Another object of the invention is to propose a messaging system in which the user can easily create a graphic and/or audio element and make it available to other users so that they can use it in their messages.

Another object of the invention is to propose a messaging system in which the user can easily and quickly synchronize, as well as keep synchronized, on multiple terminals, the graphic and/or audio elements to be used in the messages.

Another purpose is to propose a messaging system in which each user can actively use (i.e. insert into a message of which he is a sender) only the graphic elements created by him and/or purchased by him and/or—in general— authorized to him while, at the same time, as receiver of a message, he can correctly display all the graphic elements, that is, even those not created and/or not purchased by him and/or not authorized by him.

Another object of the invention is to propose a messaging system in which the graphic elements to be used in the messages are independent of the standard Unicode encoding and which, therefore, are not subject to approval by the Unicode Consortium.

Another object of the invention is to propose a messaging system which is an improvement and/or an alternative with respect to the traditional ones.

Another object of the invention is to propose a messaging system with an alternative characterization, both in functional and implementation terms, with respect to the traditional ones.

Another object of the invention is to propose a messaging system which is simple, easy and intuitive to use.

Another object of the invention is to propose a messaging system which allows a lower consumption of resources by the hardware devices involved and a lower use of the band occupied by the network.

Another object of the invention is to propose a messaging system which can be implemented simply, quickly and with low costs.

All these aims and others which will result from the following description are achieved, according to the invention, with the system having the characteristics indicated in claim 1.

Figure 2:
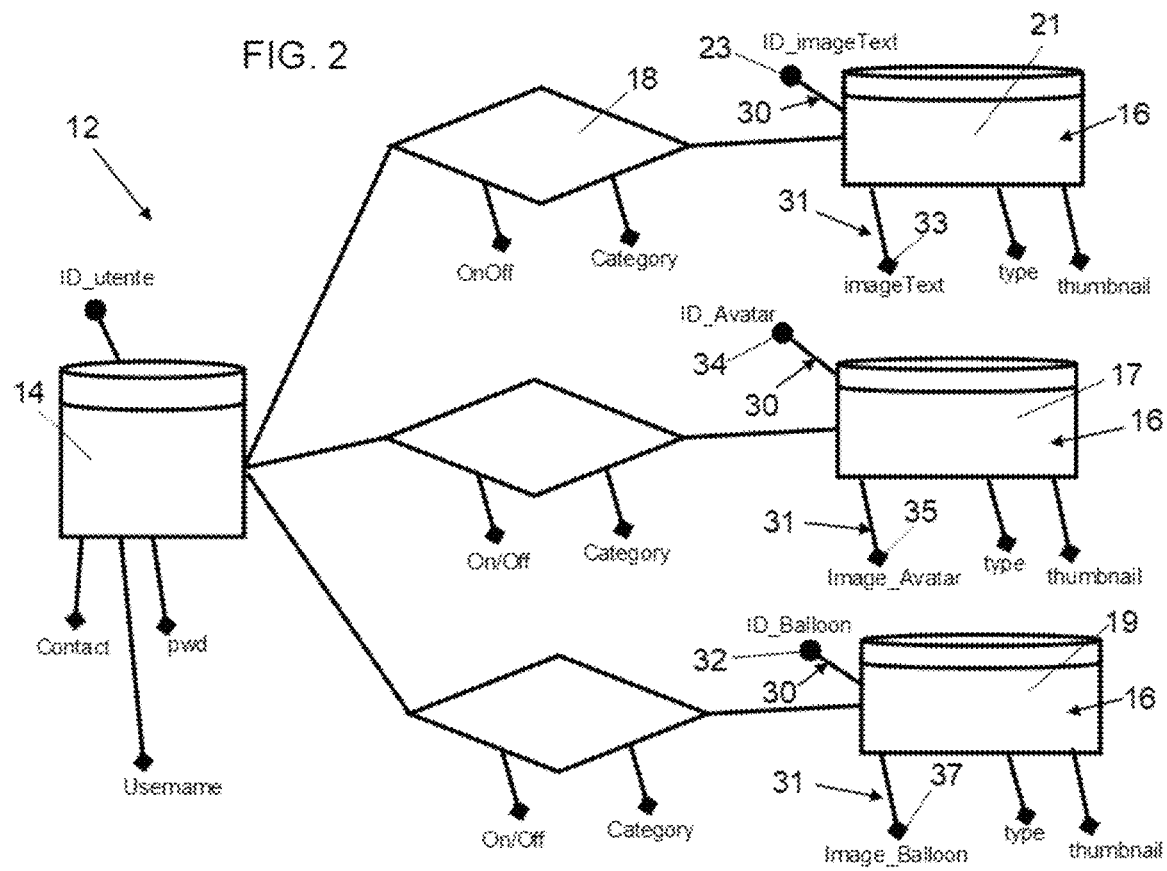
Figure 3:
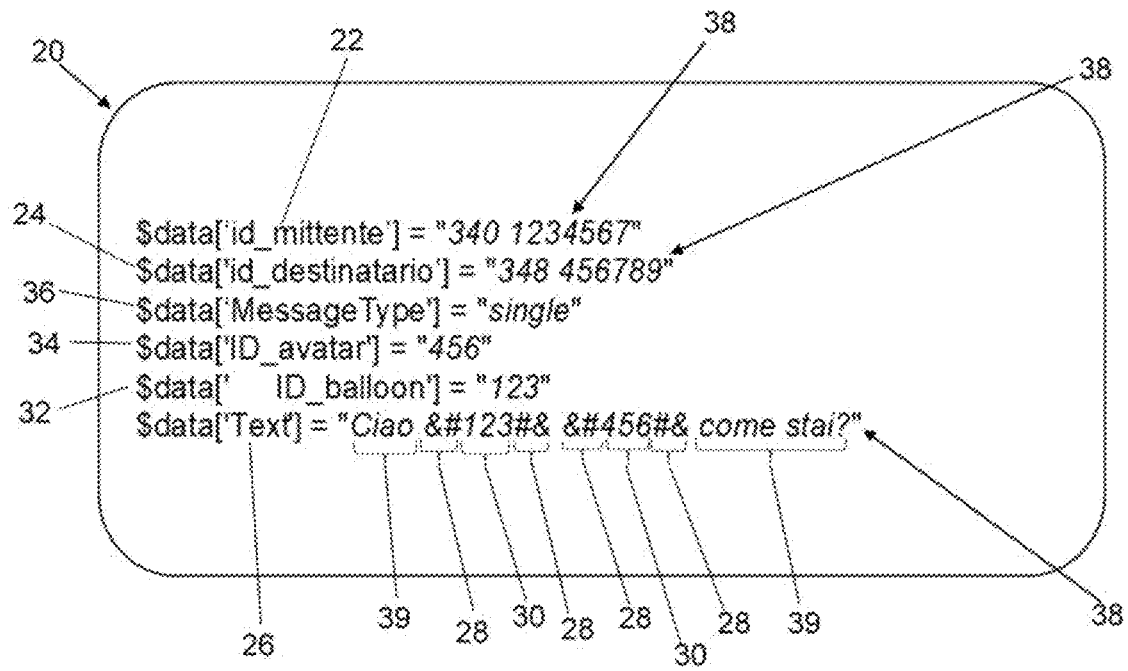
Figure 4:
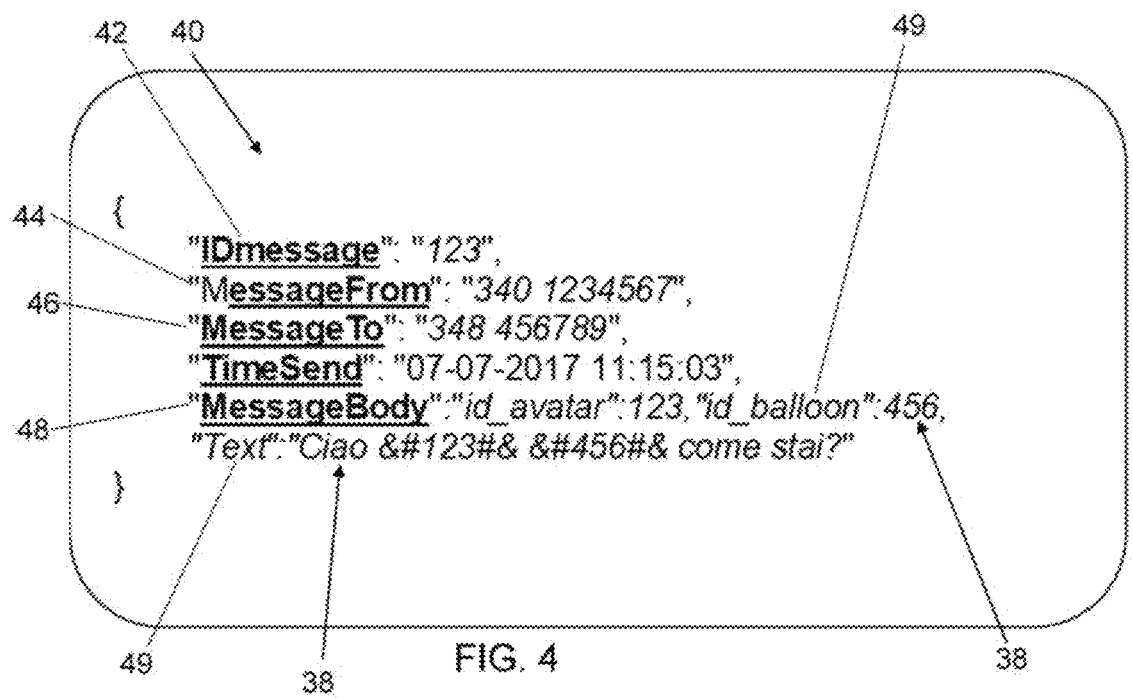
Figure 5:
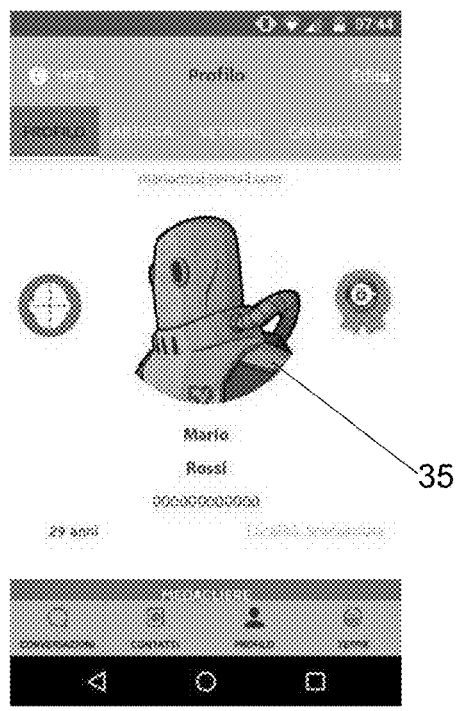
Figure 6:
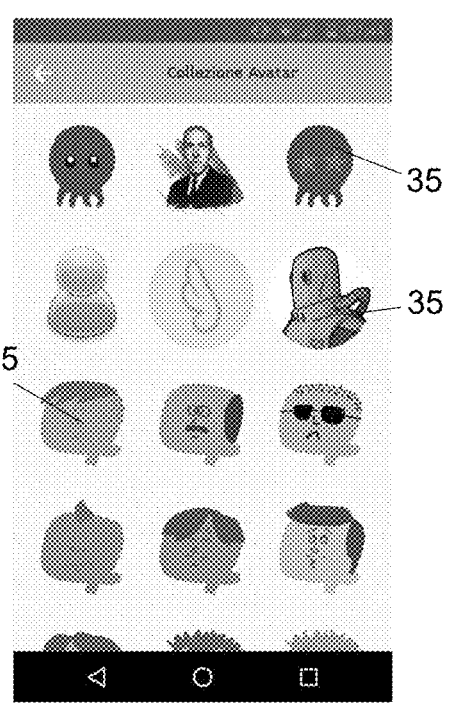
Figure 7:
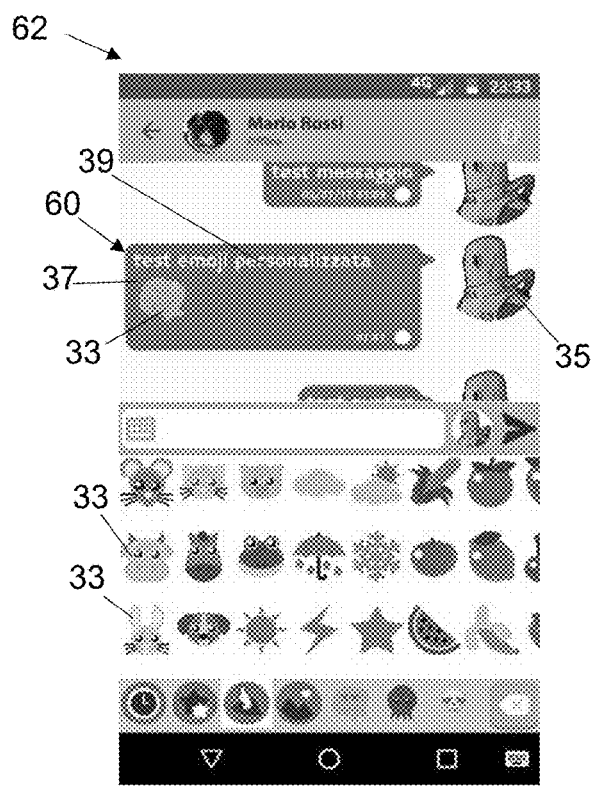
Figure 8:
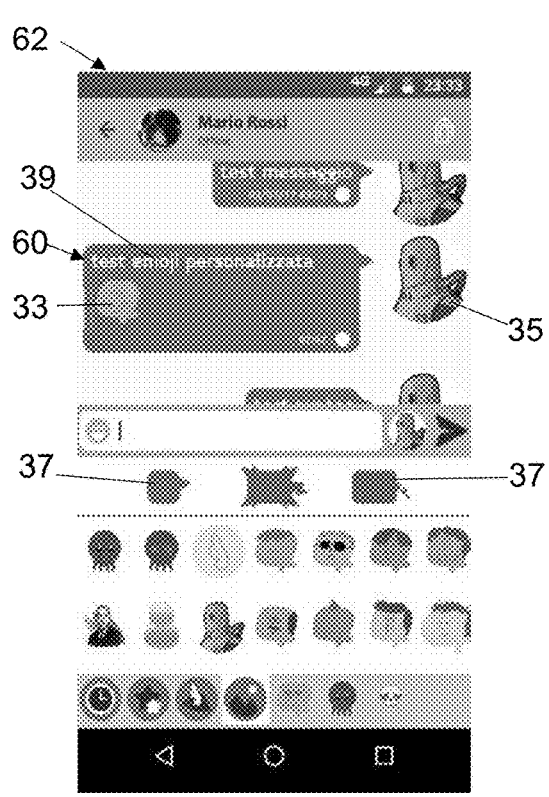
Figure 9:
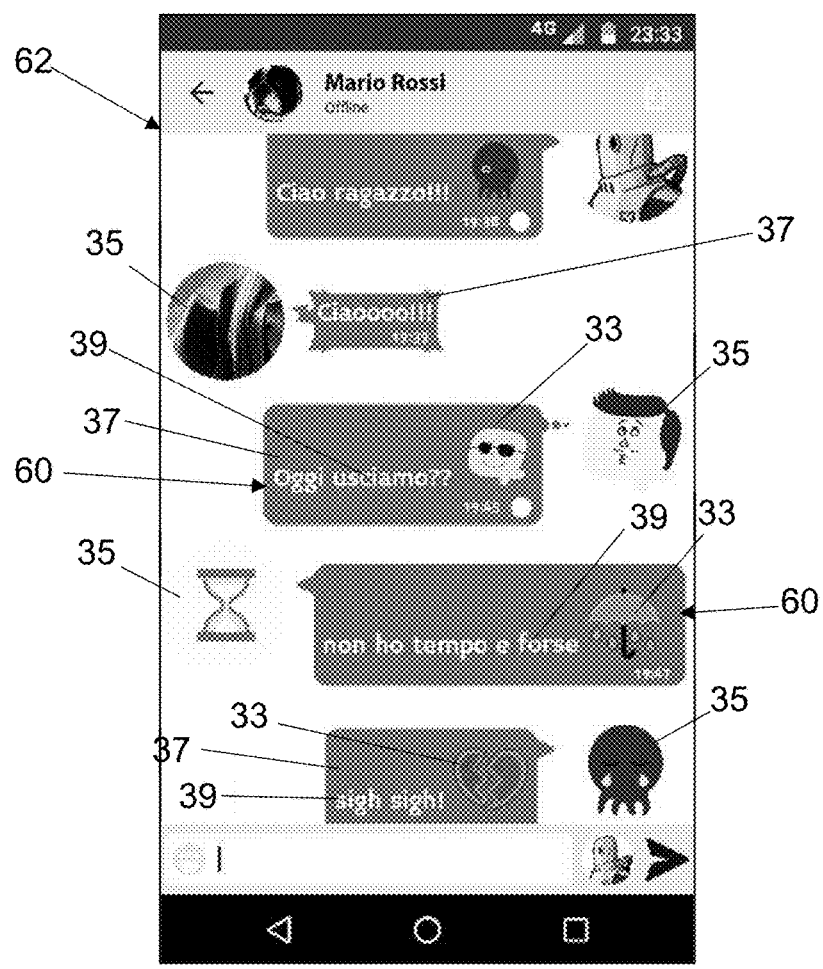
Figure 10:
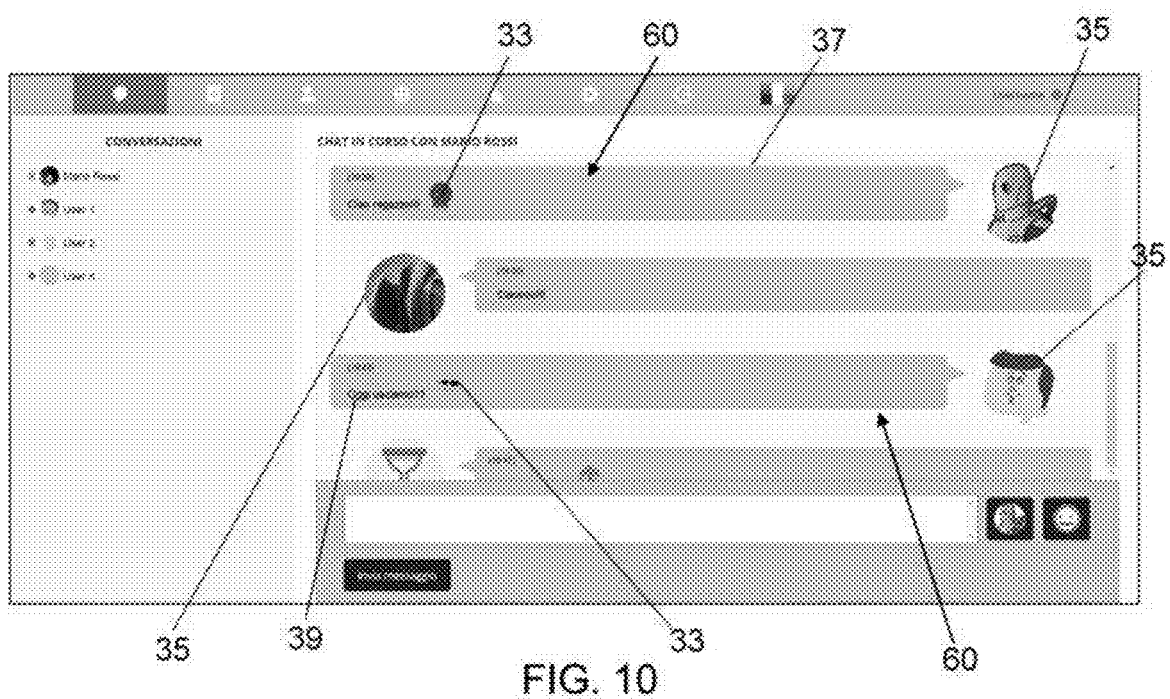
Figure 11:
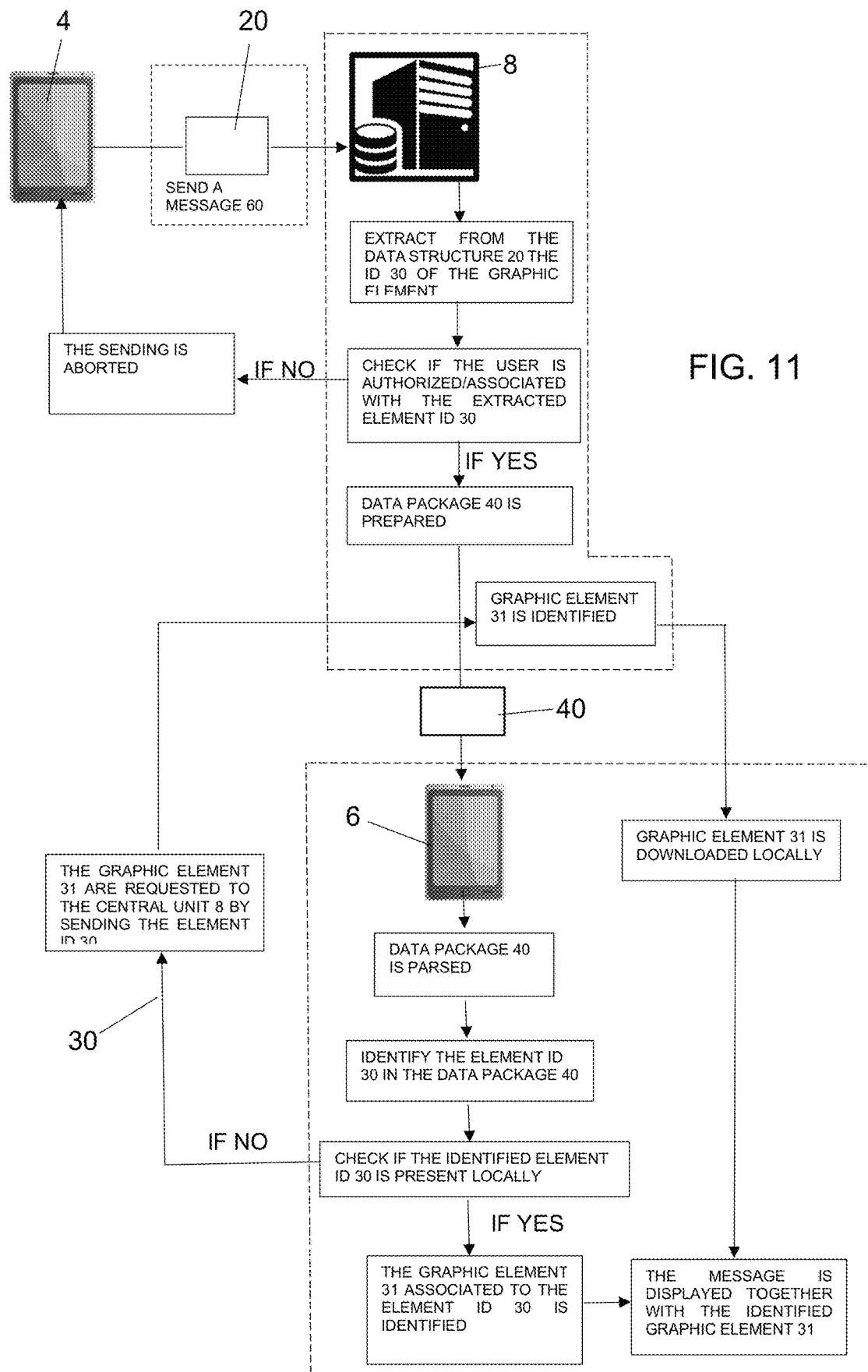
Figure 12:
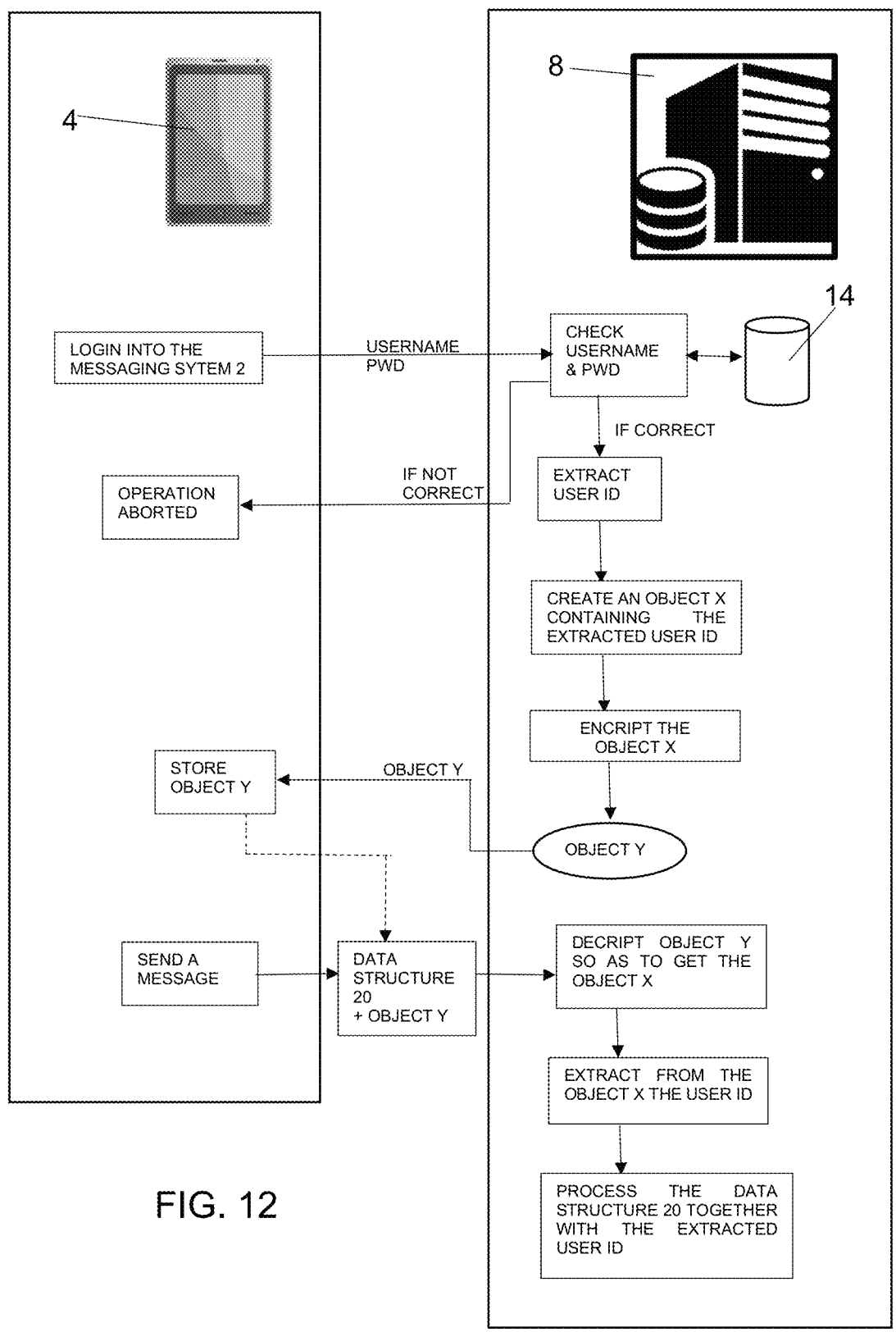
Figure 13:
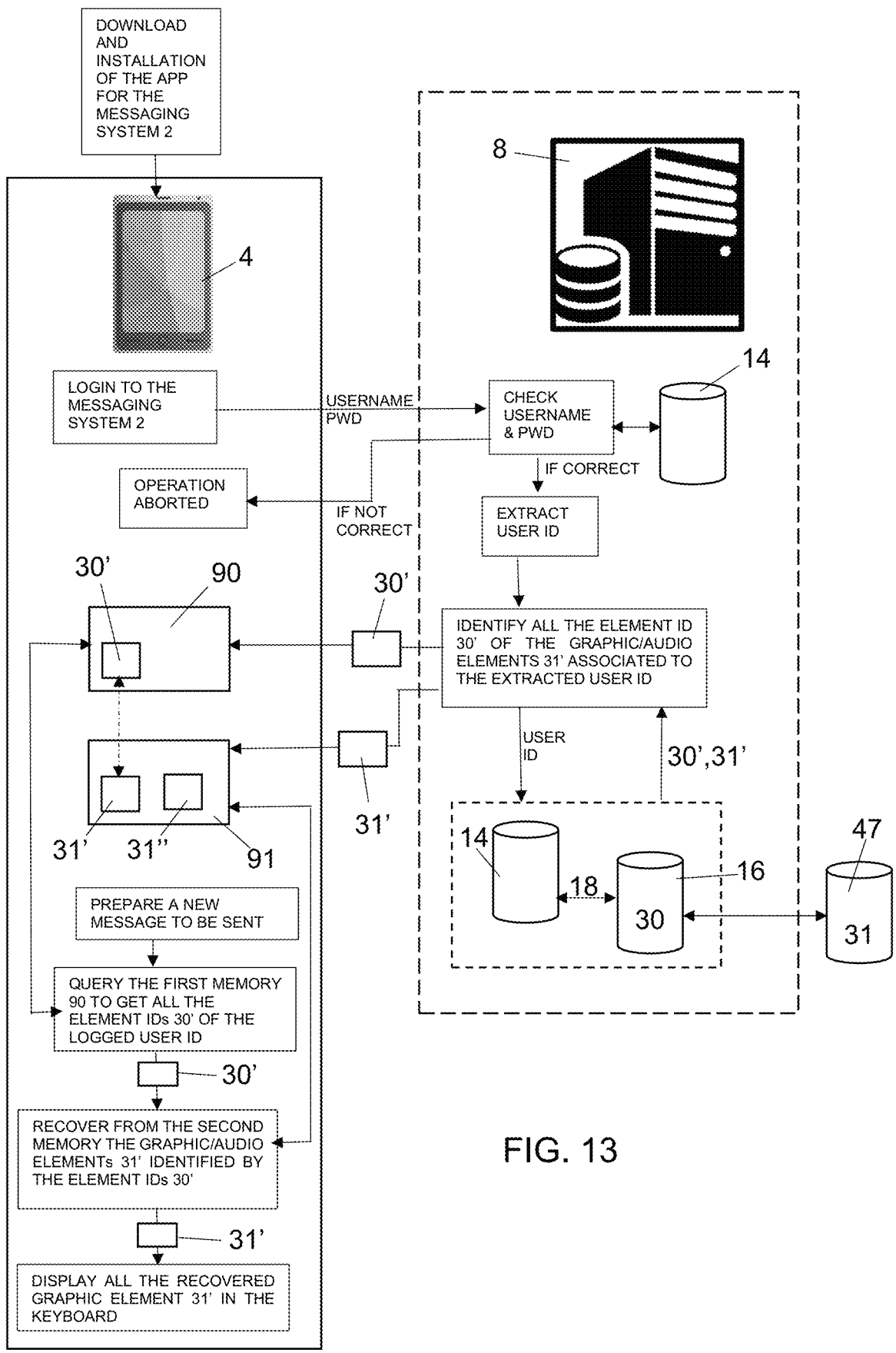
Figure 14:
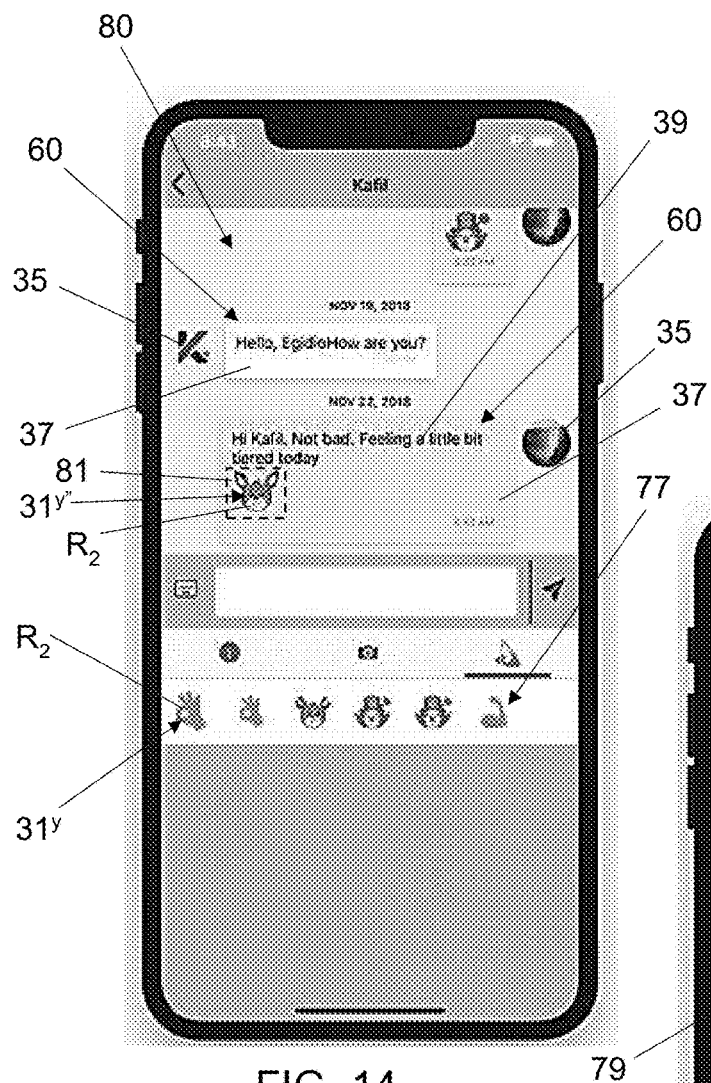
Figure 15:
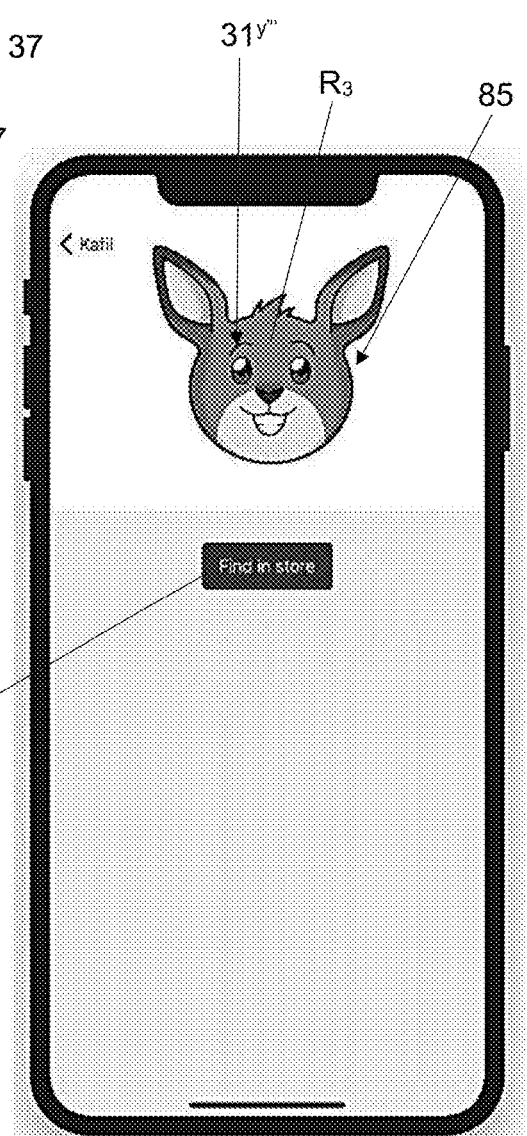
Figure 16:
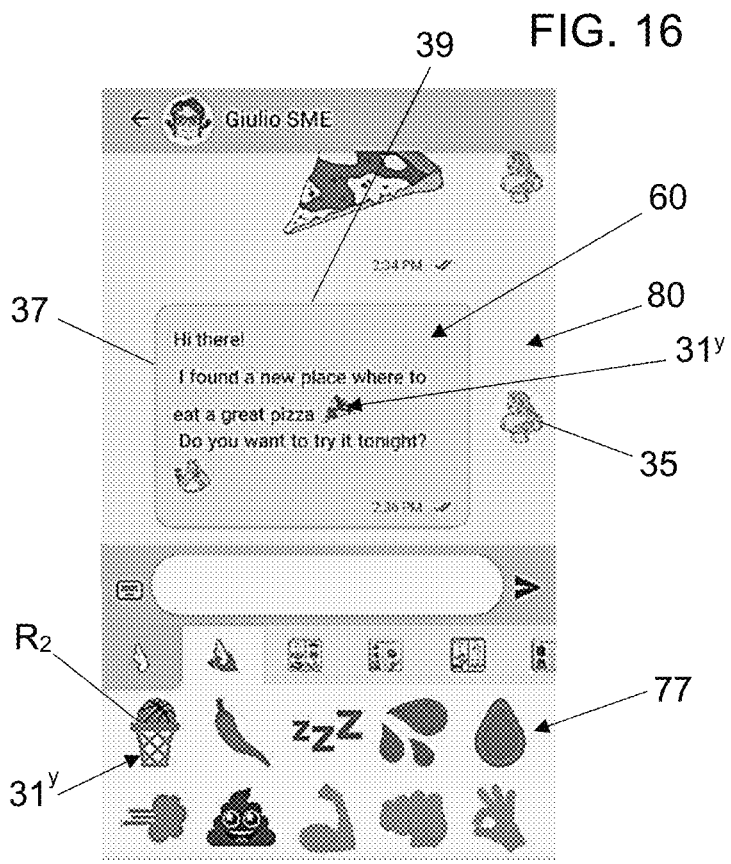
Figure 17:
Figures 18A, 18B:
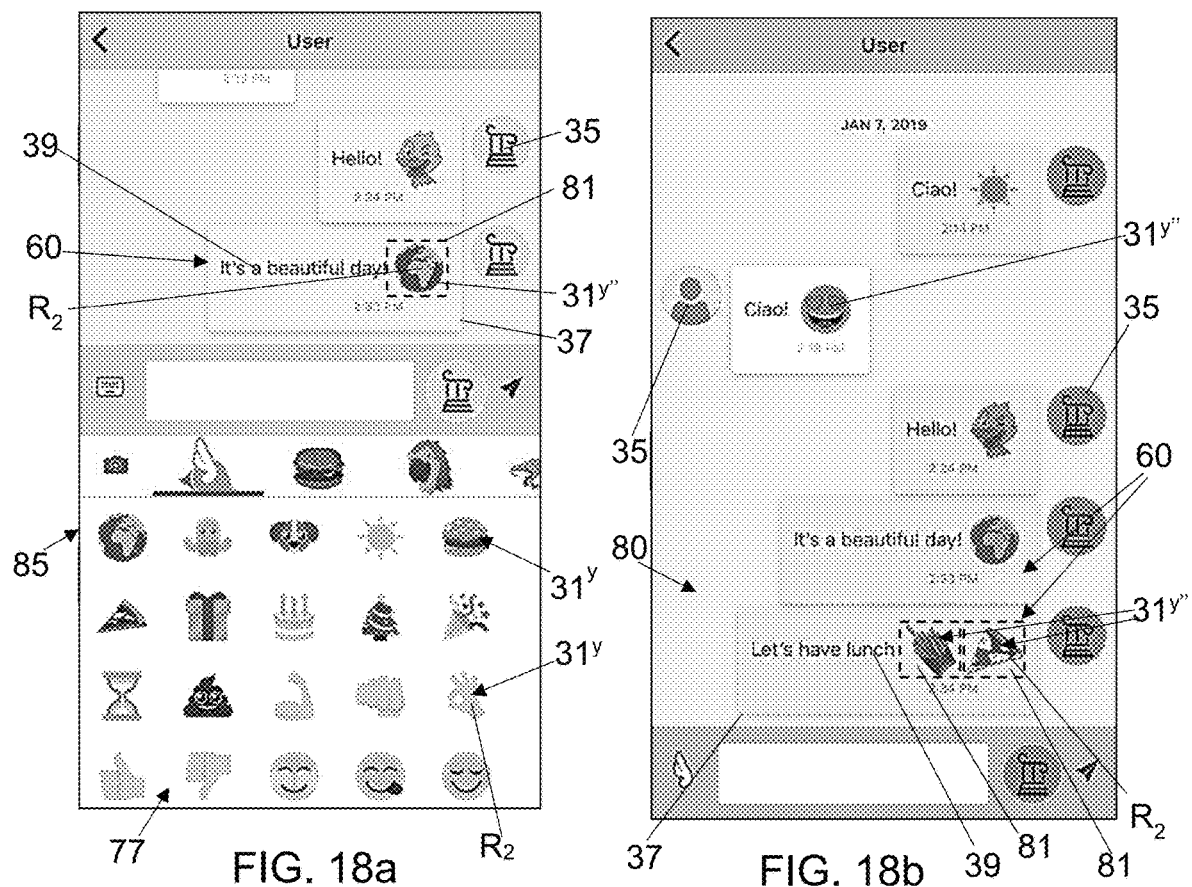
Figure 19:
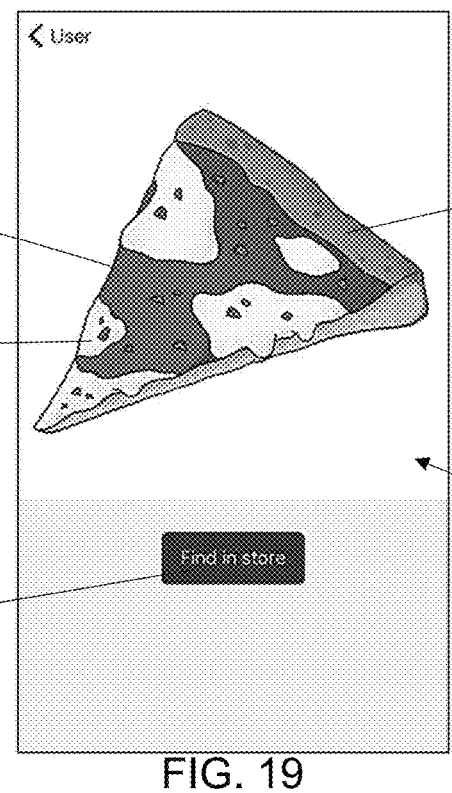
Figure 20:
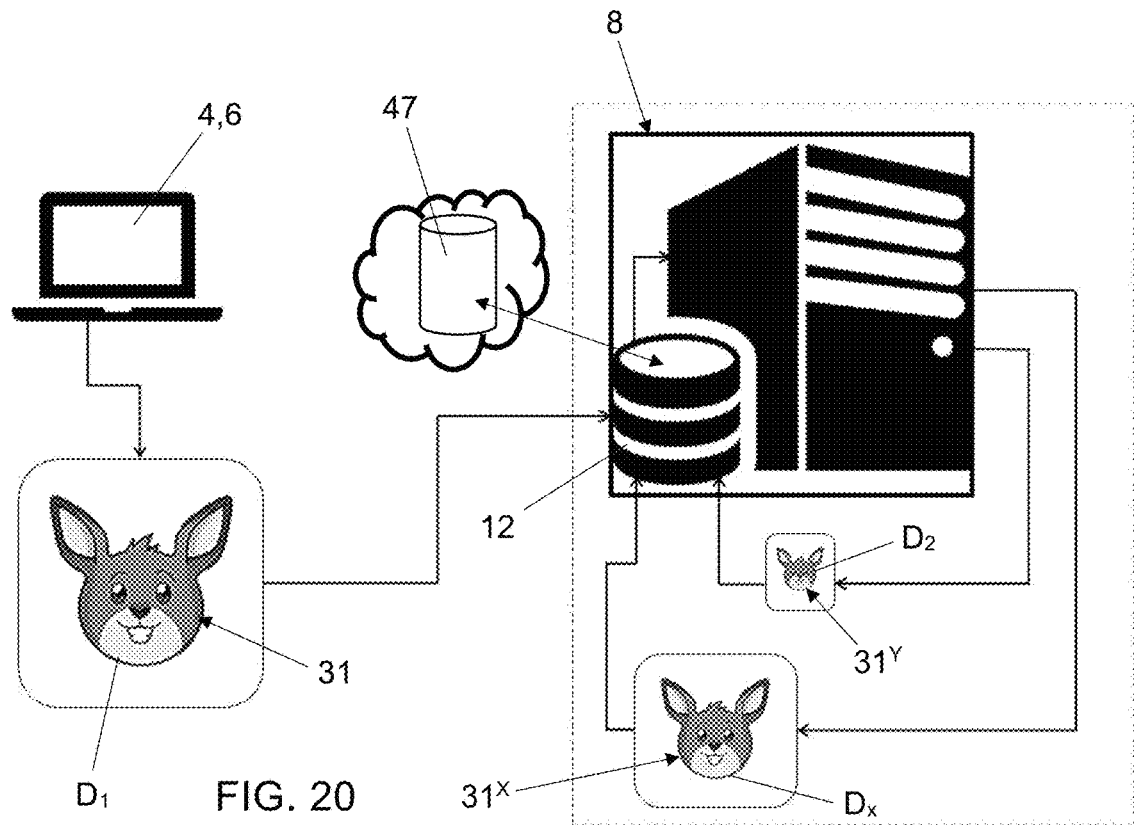
Figure 21:
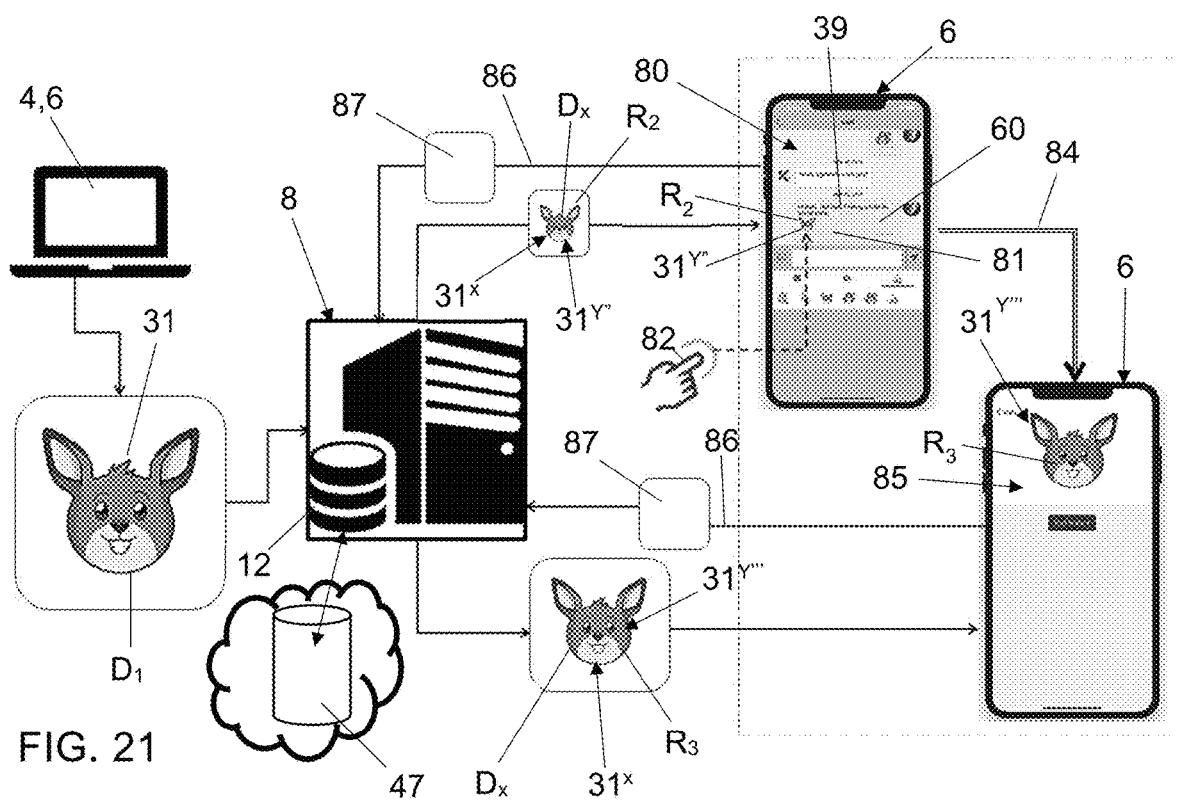
Figure 22:
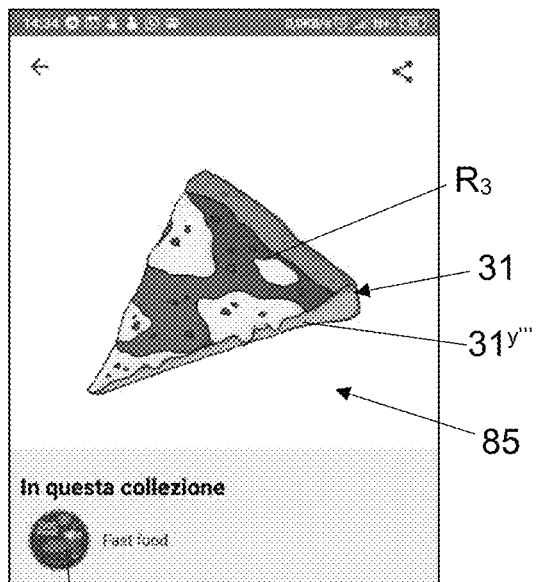
Figure 23:
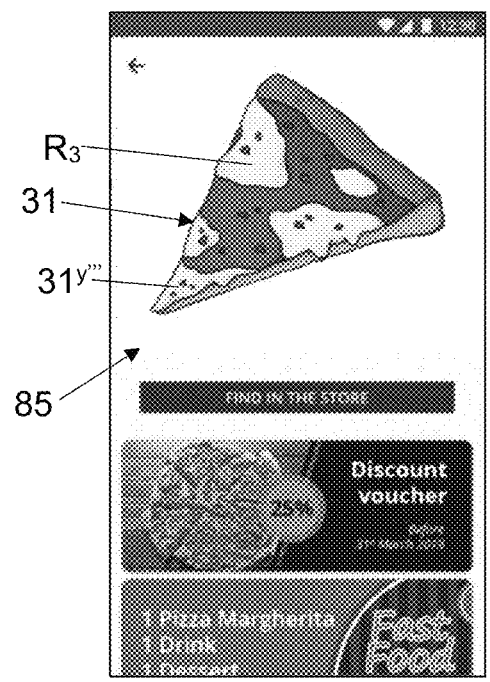
Figure 24:
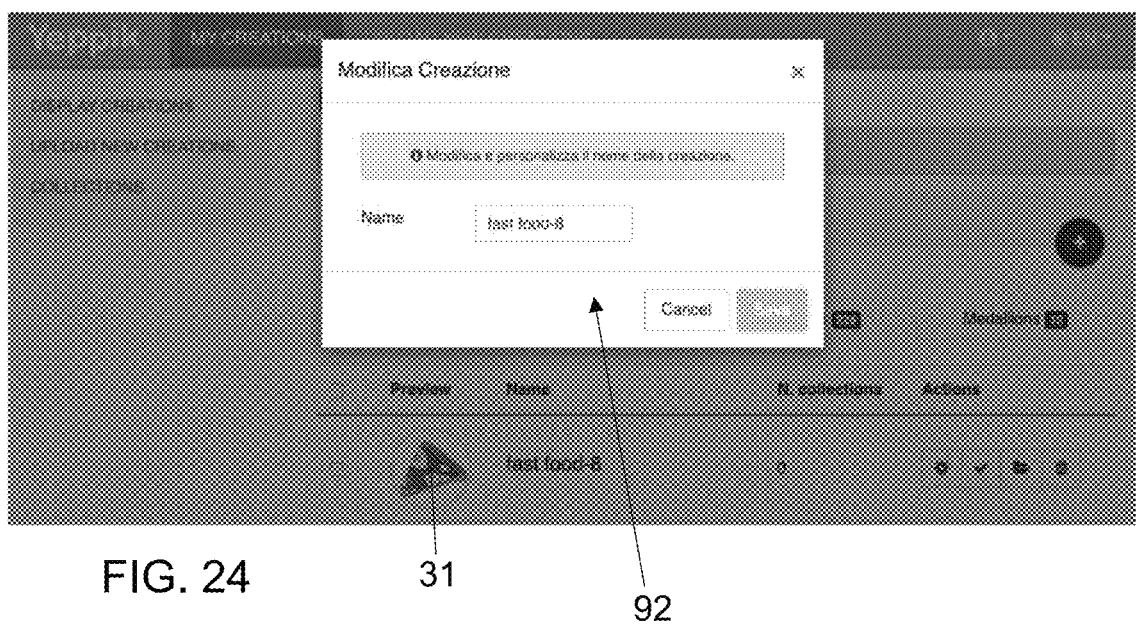

The present invention is further clarified below in a preferred embodiment thereof, reported for the purpose purely by way of non-limiting example with reference to the attached drawings, in which:

FIG. 1 shows in schematic view the infrastructure of the messaging system according to the invention, FIG. 2 shows in schematic view the implementation of the database, FIG. 3 shows an example of the data structure sent from the sending terminal to the central unit, FIG. 4 shows an example of the structured data packet processed by the central unit, FIG. 5 shows an example of the avatar selection screen, FIG. 6 shows an example of the screen depicting the avatar library, FIG. 7 shows an example of a chatting screen with the library of graphic elements to insert in the text, FIG. 8 shows an example of the screen of a chat with the balloon library, FIG. 9 shows an example of the screen of a chat in a portable device, FIG. 10 shows an example of a chat screen in a computer browser, FIG. 11 shows a flow chart of the steps provided for sending a message from a sender to the receiver in the messaging system according to the invention, FIG. 12 shows a flow chart of the functioning of the architecture/mechanism to ensure the correctness of the identity of a sending user within the messaging system according to the invention, FIG. 13 shows a flow chart of the functioning of the architecture/mechanism to synchronize and use in the sender device only the authorized graphic/audio elements, FIG. 14 shows a first example of a first screen, as implemented on the display of a portable device (smartphone) and created by means of the messaging system according to the invention, in which an exchange of messages (chat) between the sending user and the receiving user is displayed; furthermore, inside a message a graphic element is inserted in the form of a stylized graphic illustration (emoji®), FIG. 15 shows a second screen, created by means of the messaging system according to the invention, in which the graphic element of FIG. 14 is enlarged and optimized on the basis of the display size of the portable device, FIG. 16 shows a second example of a first screen, as implemented on the display of a portable device (smartphone) and created by means of the messaging system according to invention, in which an exchange of messages (chat) between the sending user and the receiving user is displayed; also inside a message a graphic element is inserted in the form of a stylized graphic illustration (emoji®), FIG. 17 shows an enlarged detail of FIG. 16, FIG. 18a shows a third example of a first screen, as implemented on the display of a portable device (smartphone) and created by means of the messaging system according to the invention, in which both the typing keyboard and an exchange of messages (chat) between the sending user and the receiving user, FIG. 18b shows a third example of a first screen, as implemented on the display of a portable device (smartphone) and created by means of the messaging system according to the invention, in which only the exchange of messages (chat) between the sending user and the receiving user is displayed, FIG. 19 shows a second screen, created by means of the messaging system according to the invention, in which a graphic element of FIG. 18b is displayed in an enlarged and optimized way on the basis of the size of the display of the portable device, FIG. 20 shows in schematic view the infrastructure of the messaging system according to the invention when loading a new graphic element into the system itself, FIG. 21 shows in schematic view the infrastructure of the messaging system according to the invention to display a graphic element first within a message in a first screen and then to display this enlarged graphic element in a second screen, the FIG. 22 shows a second screen, created by means of the messaging system according to the invention, in which the graphic element of FIG. 18b is shown in an enlarged way and in which the graphic elements belonging to the same collection/group of said enlarged graphic element are also displayed, FIG. 23 shows a second screen, created by means of the messaging system according to the invention, in which the graphic element of FIG. 18b is displayed in an enlarged way with further contents which are associated with said enlarged graphic element, and FIG. 24 shows a screen of the platform where it is possible to modify the information relating to a graphic element.

Preliminarily, it is specified that hereinafter "message" 60 means the set of all elements, both textual, graphic (both static and animated) and/or audio and/or video, which are represented in the display screen inside a single frame, which is defined below as a "balloon", or which are represented within the screen in a spaced or graphically disconnected manner with respect to the other chat messages.

In particular, a message 60 can comprise:

only text 39, or only one or more graphic elements 31, or a combination of text 39 with one or more graphic elements 31.

Conveniently, the graphic elements can also act as an identification and/or activation icon for audio elements (for example for the reproduction of so-called "voice messages") and/or video.

By "avatar" we mean instead the graphic representation used by each user to identify himself when he communicates with other users, for example in a chat, or when he sends a message.

In particular, "graphic elements" means symbols, icons or images in general (both static and animated) to be inserted—with or between any text, or even without the latter—within the balloon/message frame. Preferably, but not necessarily, these images represent a concept, an emotion or a mood, substantially corresponding to the "emoji".

As can be seen from the figures, the infrastructure of the messaging system according to the invention, indicated as a whole with the reference number 2, comprises at least one sender device 4 and at least one receiving device 6 which are provided with communication means for transmitting and receiving data with at least one central unit 8.

Conveniently, the messaging system 2 according to the invention is of the type described in PCT/IB2018/055193, the content of which is intended to be entirely incorporated herein by reference.

Advantageously, the data transfer between the devices 4,6 and the central unit 8 takes place according to a traditional client-server architecture which uses, for example, the HTTP transfer/communication protocol (Hypertext Transfer Protocol). Preferably, this transfer/communication protocol is made secure, i.e. it is, for example, of the HTTPS type, using an encrypted connection, for example according to the TLS (Transport Layer Security) or SSL (Secure Sockets Layer) cryptographic protocols.

Preferably, the sender device 4 and/or the receiving device 6 comprises a client consisting of a computer or a portable type device, for example smartphone or tablet. Preferably, the central unit 8 comprises at least a processor 10, such as for example a real or virtual remote server and/or a cloud system.

The central unit 8 comprises at least one database 12 and/or is associated with a further database 47 containing the data relating to all the graphic and/or audio elements 31 that can be managed by the messaging system 2.

Preferably, inside the unit central unit 8 is loaded at least one database 12 which is provided, in the traditional way, with supports for storing data and a processor for processing them (database server), and software applications (i.e. a database management system) for the creation, manipulation, management and efficient querying of data stored in the media.

Conveniently, as shown in FIG. 2, the central database 12 comprises:

a user dataset 14 containing the data of each user of the system; in particular, this dataset contains at least a unique ID code of the user, a username and password and, preferably, also the name and surname, a reference to be contacted (for example, the e-mail address) and other traditional data registration, one or more elements dataset 16 containing at least the unique identification codes (ID) of all the graphic elements (both static and animated) and/or audio and/or video 31 manageable through the messaging system 2; in particular, in the case of a graphic element, this dataset contains, for each graphic element, at least the unique identification code (ID) 30 of the same.

Conveniently, in particular, in the case of graphic elements, the same elements dataset 16 can also contain the data that define the actual image 31 (i.e. the numeric bitmap representation, preferably according to the base_64 encoding, or vectorial digital image), the type and/or description of the image, a miniaturized preview of the image (thumbnail) and the ID identification code of the author/creator of this graphic element.

Preferably, the elements dataset 16 contains, in addition to the unique identification code (ID) 30 of the graphic and/or audio element 31, an address/location (for example a web URL) of another/further database 47, also in the cloud—and preferably the precise address or location of the corresponding record within this database 47—in which the data defining the actual graphic and/or audio element 31 are stored in an organized way. Advantageously, according to a preferred form of realization, in dataset 16 of the central database 12, the univocal identification code (ID) 30 of the graphic and/or audio element 31 corresponds to the univocal address/location (preferably web) which identifies the record within the further database 47 (also in the cloud) where the data that define the actual element 31 are stored.

Conveniently, all the graphic and/or audio and/or video elements 31 transferable by means of the messaging system 2 according to the invention are univocally identified within the database 12 by the unique identification code 30 of the elements dataset 16. In particular, this means that, within the database 12, each graphic and/or audio and/or video element 31 that can be managed and transferred through the messaging system 2 is equipped with its own unique identification code which, therefore, is certainly distinct and different from that of all the other graphic and/or audio elements. Preferably, the unique identification code 30 of each graphic and/or audio and/or video element 31 of the element datasets 16 is created randomly or predetermined (and then associated) by a specific assignment software module provided in the database 12 and/or anywhere inside the central unit 8.

Suitably, the database 12 is configured and structured so that the user dataset 14 and the elements dataset 16 are associated with each other by means of a relationship 18 (which basically constitutes another dataset) containing the elements 31 of dataset 16 which are available/usable/manageable by each user of dataset 14.

Preferably, each row of the relation dataset 18 contains the unique identification code ID of a user (as derives from the user dataset 14), a unique identification code 30 of a graphic and/or audio element 31 (as they derive from the elements dataset 16) which is associated with that particular user and an indication if this user is enabled/authorized or not to use this graphic and/or audio element 31 within the messaging system 2.

Suitably, the database 12 is configured and structured so that, in relation 18, the same graphic and/or audio element of dataset 16 can be associated, and therefore managed, by multiple users of dataset 14. Conveniently, according to the invention, it is understood that the database 12 of the central unit 8 contains the data of all the graphic and/or audio elements of all users.

Advantageously, in this way, i.e. by relating each user with one or more graphic and/or audio elements 31 (and therefore also vice versa, i.e. by relating each graphic and/or audio element with one or more users), an architecture in which each user can manage and actively use (i.e. as a sender within a message) only the graphic and/or audio elements 31 associated with him, according to the provisions of the relationships 18 between the datasets 14 and 16. Basically, a certain user is enabled/authorized to insert, within a message to be sent, a certain graphic and/or audio element 31 only if there is a relationship 18 between that user and said element, and in particular if the user's unique ID identification code is related to the unique identification code 30 of said element.

Suitably, the report 18—which precisely allows to enable/authorize a certain user to use a particular graphic and/or audio element 31 within a message to be sent—can be created when the user is the person who created/uploaded this graphic and/or audio element inside the messaging system 2 and/or when the user has been authorized—for example because he purchased it free of charge or for a "fee"—to use this graphic and/or audio element within the messaging system 2.

Suitably, the database 12 is configured and structured so that the user dataset 14 and the elements dataset 16 are associated with each other by means of two types of relationships 18 (which thus substantially define two further datasets) containing respectively the elements of dataset 16 that have been created by each user of dataset 14 and the elements of dataset 16 for which each user of dataset 14 is authorized/enabled status (for example because it made the corresponding purchase).

Suitably, the messaging system according to the invention is configured so that:

the first software module sends to the central unit 8 a request for authorization/license, preferably upon payment of a fee, for the use of a certain graphic and/or audio element 31, and following the acceptance of the request, the software defines a relationship 18 between the unique identifier of the user who sent said request to the central unit 8 and the univocal identification code 30 of the graphic and/or audio element 31 for which the request was made.

Advantageously, as shown in FIG. 2, the elements dataset 16 comprises a first dataset 21 containing the data and/or the references (i.e. the addresses or the location in another/further database 47) of symbols, icons or images in general 33 to be inserted, with or between the any text 39, inside the balloon of the message itself, as well as a unique identification code (ID) 23 of these images 33 which can be inserted with or between the text of the message. Preferably, but not necessarily, these images 33 represent in a stylized way at least a concept, an idea, an object, an emotion or a mood, substantially corresponding to the emoji®.

Advantageously, as shown in FIG. 2, the elements dataset 16 comprises a second dataset 17 which contains the data (comprising at least one unique identification code) and/or the references (i.e. addresses or location in another database) of symbols, icons or images in general to be used as avatar 35, as well as a unique identification code (ID) 34 of the same.

Advantageously, as shown in FIG. 2, the elements dataset 16 comprises a third dataset 19 which contains the data (including at least one unique identification code) and/or the references (i.e. addresses or location in another database) of balloon 37 of different shapes or sizes that enclose the text of the message, as well as a unique identification code (ID) 32 of the former.

Suitably, any person, as an author, and not necessarily identified/registered in the user dataset 14, can generate a graphic and/or audio element and load it appropriately in the elements dataset 16 of the central database 12 and/or in the additional connected database 47 so that it is available to users of the system 2, as identified/registered in the user dataset 14, and thus allowing them to download locally on their devices, from the database 12 and/or from the additional connected database 47, the graphic and/or audio elements identified with the unique identification codes 30 present in the elements dataset 16 so that they can then be used in the messages to be sent within the messaging system 2, as will be better clarified below.

Advantageously, as mentioned, the elements dataset 16 contains—and/or is connected to another database 47 which in turn contains—the data that define/constitute the graphic and/or audio element 31 and, in particular, the set of data—suitably coded according to a certain format—which define a digital image or sound or video.

Conveniently, in the central database 12 or in the further database 47 connected to said central database 12, the data 31 which define the graphic and/or audio element with initial dimensions and degree of detail D1 which advantageously corresponds to that of its creation and/or is the maximum achievable are stored.

In particular, in the case of a graphic element, suitably, in the central database 12 or in the further database 47 connected to said central database 12, the data 31 are stored which define a digital image having resolution equal to $R_1$. Suitably, the resolution $R_1$ indicates the number of pixels per inch that the image has in height and in width.

Preferably, the resolution $R_1$ corresponds to the resolution of the original/initial image which is loaded by the author of the image itself or by another subject. Advantageously, the resolution $R_1$ is a high-resolution value which allows to appreciate all the details of the image. Suitably, the resolution $R_1$ is substantially equal to or greater than 1080×1080 pixels, preferably with DPI ("dots for inches") equal to or greater than 72. In particular, suitably, in the central database 12 or in the further database 47 connected to said central database 12, the data 31 are stored which define a digital image having color depth (i.e. the parameter generally expressed in bits indicating the number of colors that each pixel can take) equal to $P_1$. Suitably, the color depth $P_1$ corresponds to the color depth of the original/initial image which is loaded by the author of the image itself or by another subject. Advantageously, the color depth $P_1$ is a high value which allows to appreciate all the color details of the image. Preferably, the color depth $P_1$ is substantially equal to or greater than 8 bits.

In particular, suitably, in the central database 12 or in the further database 47 connected to said central database 12, the data are defined which define a digital image having dimensions in pixels (i.e. the total number of pixels along the width and height of an image) equal to $L_1$ for the length and equal to $H_1$ for the height. Suitably, the dimensions $L_1$ and $H_1$ correspond to those of the original/initial image which is loaded by the author of the image itself or by another subject. Advantageously, the dimensions $L_1$ and $H_1$ have a high value which allows to appreciate all the details of the image. Preferably, the dimensions $L_1$ and/or $H_1$ are substantially equal to or greater than 1080 pixels respectively.

Alternatively, in the case of an audio file, the data 31 defining the audio file is stored in the central database 12 or in the further database 47, preferably in a "lossless" format, i.e. with a level of detail that substantially corresponds to that with which the audio file was recorded, for example in FLAC, APE or ALE format. Preferably the data 31 can be in high definition, i.e. with a resolution $R_1$ which corresponds to a bit-rate of at least 1200 kbit/minute. Preferably the data can have a depth of at least 44.1 kHz/16 bit.

Alternatively, in the case of a video file, the data defining a video file with a high level of detail preferably in high definition is stored in the central database 12 or in the further database 47, i.e. with a resolution $R_1$ that corresponds for example to a video in HD (1920×1080 pixels) or in 4K (3840×2160 pixels, 4096×2304 pixels or 4096×3072 pixels) preferably in progressive mode, and with high definition audio.

The sender and receiver devices 4, 6 are configured to perform, by means of the central unit 8 with which both devices are in communication, sending and receiving on the network, either via the internet or local network, of text messages 60.

A first software module is loaded and/or executed inside the sender 4 and/or receiver 6. Conveniently, in the case of a portable device such as a smartphone or tablet, the first software module consists of a native mobile software application, also known as an APP. Suitably, the first software module can also be in the form of a web application or a desktop application.

The first software module of the device 4, 6 is also configured to load into the database 12 of the central unit 8, or into the further database 47, a graphic and/or audio element generated by a user (author) in order to then also make it available to users of the messaging system 2

In particular, for this purpose, the first software module of a device 4, 6 sends a particular graphic and/or audio element to the central unit 8 (see FIG. 21) 31, which was generated or is available locally on a device, and the central unit 8 stores it inside the database 12 associating them with a unique identification code 30.

Conveniently, the graphic and/or audio element 31 that is sent and loaded inside the database 12 of the central unit 8, or in the further database 47, it has particularly high dimensions and/or degree of detail (hereinafter referred to as $D_1$) and, preferably, corresponding to the maximum obtainable and/or corresponding to what the graphic and/or audio element presents when it is created. In particular, in the case of images, an image having a resolution equal to $R_1$ and, possibly, dimensions in pixels $L_1$ and $H_1$ or depth of color $P_1$. Therefore, in the database 12 of the central unit 8, or in the further database 47 connected to it, an image having a resolution equal to $R_1$ is thus loaded and stored and, possibly, pixel dimensions $L_1$ and $H_1$ or color depth $P_1$.

Conveniently, in the case of an audio file, the level of detail D can be associated, for example, with the bitrate and/or with the compression codec (format). Conveniently, in the case of a video file, the level of detail D can be associated with a combination of the level of detail of the images and that of the audio file.

Suitably, in order for a graphic and/or audio element 31 to be used/inserted within a message 60 by a sending user, the graphic element 31 with its unique identifier 30 must be available/present in the local memory of the sender device 4 so that this unique identification code 30 can be suitably inserted inside the message 60, and therefore the data structure 20 sent to the central unit 8, according to the methods described below.

Conveniently, the messaging system 2 also includes a software, which is loaded and/or executed in the central unit 8 and is configured to define a relationship 18 which associates a user with a corresponding graphic and/or audio element 31 (and in particular it associates the unique identification code ID of this user with the unique identification code 30 of the graphic and/or audio element 31), and vice versa, so that this user can use in the messages to be sent only the graphic and/or audio elements 31 which are associated with the user himself through a relationship 18.

Advantageously, as shown in FIG. 20, the software, which is loaded and/or executed in the central unit 8, is configured to create—starting from the graphic and/or audio element, which is already loaded into the database 12 of the central unit 8 or in the further database 47, and which has high dimensions and/or degree of detail and equal to $D_1$—at least one corresponding graphic and/or audio element 31$^Y$ having the same content but dimensions and/or degree of detail $D_2$, where $D_2$ is lower than $D_1$.

Suitably, the graphic and/or audio element 31$^Y$ of size and/or degree of detail $D_2$ is created automatically as soon as the graphic and/or audio element, of size and/or high degree of detail equal to $D_1$, is loaded into the database 12 of the central unit 8 or into the further database 47.

Conveniently, the graphic and/or audio element 31$^Y$ of size and/or degree of detail D2 is created automatically when the first purchase of the graphic and/or audio element is made or when it is requested or the first download to a sending/receiving device or even when it is required to be used within the messaging system 2.

Advantageously, the corresponding graphic and/or audio element 31$^Y$ having dimensions and/or degree of detail $D_2$ is also loaded and stored within the data set elements 16 of the database 12 of the central unit 8 or in the further database 47.

Advantageously, the graphic and/or audio element 31$^Y$ of size and/or degree of detail $D_2$, thus created, can correspond substantially to a compressed version of the graphic and/or audio element of size and/or degree of detail $D_1$.

Advantageously, the graphic and/or audio element 31$^Y$ of size and/or degree of detail $D_2$, so created, it can be adequate in size and/or have degree of detail suitable to be used and inserted in a message 60, preferably also between the words in the message itself.

Advantageously, the graphic and/or audio element 31$^Y$ of dimensions and/or degree of detail $D_2$, thus created, can have the same format or a different format with respect to the graphic and/or audio element of dimensions and/or degree of detail $D_1$.

Advantageously, the graphic and/or audio element 31$^Y$ of size and/or degree of detail $D_2$, thus created, is suitable for use as a preview of the graphic and/or audio element of size and/or degree of detail $D_1$.

In particular, in the case of images, the software, which is loaded and/or executed in the central unit 8, is configured to create—starting from the file which is already loaded into the database 12 of the central unit 8 or in the further database 47, and which has resolution $R_1$ and, possibly, color depth $P_1$—at least one corresponding file 31$^Y$ having the same content but resolution $R_2$ which is lower than $R_1$ and, possibly, in the case of a graphic element, having color depth $P_2$ which is lower than $P_1$.

Conveniently, in the case of images, the software, which is loaded and/or executed in the central unit 8, is configured to create—starting from the image that is already loaded to the inside the database 12 of the central unit 8 or in the further database 47, and which has resolution dimensions $L_1$ and $H_1$—at least one corresponding image 31$^Y$ having the same content but dimensions L2 and H2 which are lower than the aforementioned dimensions $L_1$ and $H_1$.

Preferably, the image 31$^Y$ with resolution $R_2$, thus created, substantially corresponds to a "thumbnail" version of the starting image having resolution $R_1$ and corresponding to that which, after the its creation, was sent and stored in the central unit 8.

Conveniently, the first software module is configured so that on the display of the sender device 4 of a certain user a typing keyboard 77 is shown in which the graphic and/or audio elements 31$^Y$ of size and/or degree of detail $D_2$ are represented.

Advantageously, as represented in FIG. 20 and as will be described more in detail below, the software, which is loaded and/or executed in the central unit 8, is configured to create—starting from the graphic and/or audio element 31, which is already loaded into the database 12 of the central unit 8 or into the further database 47, and which has a high size and/or degree of detail equal to $D_1$—a corresponding graphic and/or audio element 31$^x$ having the same content but dimensions and/or degree of detail $D_x$, where $D_x$ is less than $D_1$ and is defined correspondingly and dynamically on the basis of the size and/or degree of detail of the display of a certain device which has made request to said central unit 8 by means of the first software module.

Preferably, the first software module is configured so that on the display of the sender device 4 of a certain user a typing keyboard 77 is displayed containing only the graphic and/or audio elements 31 which are associated with that user by means of a relationship 18, i.e. for which the user himself has been authorized/enabled as creator of the graphic and/or audio element or for example because he purchased it. Advantageously, the first software module is configured so that the users of the system 2, as identified and already registered in the user dataset 14, can load into the messaging system 2 (and in particular send to the database 12 of the central unit 8) a graphic and/or audio element created by them; in particular, in this case, the software—loaded and executed in the central unit 8—is configured to create a new relationship 18 (preferably of the first type defined above) which associates the user identification code with the unique identification code 31 of the graphic and/or audio element 31 thus loaded.

Advantageously, the first software module is configured so that users of the system 2, as identified and already registered in the user dataset 14, can request and obtain authorization/license—for example by direct or indirect purchase, free of charge or behind payment of a "fee"—to use, within a message to be sent, a graphic and/or audio element created by other users; in particular, also in this case, the software is configured to create a relationship 18 (preferably of the second type defined above) which associates the user identification code with the unique identification code 31 of the graphic and/or audio element 31 thus authorized/licensed.

In particular, the first software module is also configured to send text messages 60 by making a request to the central unit 8 (server) on the basis of a communication protocol, preferably HTTPS. Advantageously, this request is made by means of the POST method so as to send a data structure 20 to the central unit 8 without showing them in the search string (query-string), however this request could also be made by means of the GET method thus passing the data in the search string.

Suitably, the data structure 20 (defined as "$ data" in FIG. 3), which is generated by the first software module, contains all the data/values/records of the fields to be sent as input to the software that is loaded and executed in the computer 10 of the central unit 8. More in detail, as shown in FIG. 3, the data structure 20 contains the following fields:

conversation identification field ("id_conversation") and/or receiver 24 (i.e. "receiver id"), text field of message 26 (i.e. "Text").

Conveniently, in one embodiment, the data structure 20 can also contain a sender identification field 22 (i.e. "sender_id"), In particular, the message text field 26 contains both text 39 (i.e. the set of words that make up the message) and the unique identification code 30 of a graphic and/or audio element 31. Suitably, this unique identification code 30, which is inserted within the text field 26, is suitably positioned, upstream and/or downstream, between labels/pre-coded characters/symbols 28. More in detail, as shown in FIG. 3, the identification code "123" of a first graphic element is inserted between the pre-coded characters "& #" and the same applies to the identification code "456" of a second graphic element.

Advantageously, the data structure 20 also comprises a field for uniquely identifying the balloon 32 (i.e. "ID_balloon") and a field for uniquely identifying the avatar 34 (i.e. "ID_avatar"). Advantageously, the data structure also includes a field for defining the type of message 36 (i.e. "Message Type") and for indicating whether it is a message sent to a single receiver or to multiple receivers.

Suitably, the first software module is configured to assign to fields 22, 24, 26, 32, 34 and 36 of the data structure 20 the corresponding values 38 which are set and selected by the user by acting on the graphic interface of the sender device 4 at the moment of the preparation and sending of a message 60 and/or are defined automatically by the software module itself. For example, the receiver identification field 24 and the message text field 26 are enhanced based on what the user has chosen by acting on the graphic interface of the device, while the sender identification field 22—if provided—can be enhanced directly and automatically by the software module based on the default settings on the device.

As said, the software is loaded and executed inside the processor 10 of the central unit 8.

Advantageously, in a preferred embodiment, the first software module loaded in the sender device 4 and the software loaded in the central unit 8 are also configured to implement an architecture/procedure for authenticating the sending user (see FIG. 12) which is using messaging system 2 and this in order to ensure the correctness of the identity of a sending user within the messaging system according to the invention.

In particular, in order to implement this authentication procedure of the sending user, the first software is configured to perform the following operations:

the first software module of the sender device 4 sends the data (username and password) that the user enters, acting on his sender device 4, when logging in to the messaging system 2, to the software of the central unit 8, the software of the central unit 8 checks the received data (i.e. checks—preferably by querying the user dataset 14—if they together correspond to a user already registered to the messaging system), extracts the ID identification code of the corresponding user and generates a corresponding one computer object X containing—among other things—this code, unit software 8 encrypts the computer object X with a private key, thus generating the encrypted computer object Y, the software of the central unit 8 sends the encrypted computer object Y to the first software module of the sender device 4, which temporarily stores it.

suitably, when a user sends—via the sender device 4—a text message 60, the following operations are carried out:

the first software module sends to the central unit 8 both the data structure 20 and the encrypted computer object Y previously received, the software of the central unit 8, preferably before processing the data structure 20, decrypts the encrypted computer object Y and thus extracts the computer object X containing the user ID identification code;

the software of the central unit 8 proceeds to process the data structure 20 also having the user ID identification code available.

Suitably, it is understood that in this case, the data structure 20 does not contain the identification field of the sender 22. Advantageously, in this way, only the central unit 8 knows, possesses, extracts and verifies the ID identification codes of the corresponding users, thus avoiding that it is the first software module of the sender device 4 from finding and send ("in clear", that is in an unencrypted way) to the central unit 8 the code of the sending user, with the possible risk of alterations or client-side changes. Therefore, for each data structure 20, and therefore for each message sent, the central unit 8 can derive in a certain way—and without any possibility/danger of alterations—who the sending user of said message is, thus authenticating the identity of this user and also ensuring that the latter is registered within the messaging system 2.

Advantageously, as an additional security check (see FIG. 11) in order to prevent a user from using within the messaging system 2 in the messages to be sent graphic and/or audio elements 31 for which it has not been correctly or effectively authorized/enabled, the software loaded and executed in the central unit 8 is configured so as to:

extracting from the data structure 20 (which was sent to said unit 8 from the sender device 4) the unique identification code 30 of a graphic and/or audio element 31, check whether the user who sent the data structure 20—and whose ID identification code was preferably recovered during the authentication phase described above—is enabled/authorized to use/insert in the messages to be sent the graphic and/or audio element 31 associated with the previously extracted unique identification code 30; in particular, for this purpose, the database 12 is queried to check if there is any relationship 18 which associates the identification code of the user who sent the data structure 20 using the sender device 4 (and whose data result from the user dataset 14) and the unique identification code 30 which was extracted from the structure 20 (and whose data result from the elements dataset 16). More in detail, for example, a first query can be made to check if there is a first type of relationship 18 (i.e. if the user is the person who created/loaded the graphic and/or audio element in the messaging system 2) and, only in the event of a negative outcome of this first query, a second query is made to check whether there is a second type of relationship 18 (i.e. whether the user has been enabled/authorized to use the graphic and/or audio element in the messaging system 2 for example following a purchase);

in case of a positive outcome of the verification, it then continues with the processing of the request sent by the sender device so as to return a structured data packet 40 in a format suitable for data exchange; on the contrary, on the other hand, in the event of a negative outcome of the verification, the processing of the request sent by the sender device 4 is interrupted/blocked and, appropriately, a corresponding notice can be automatically sent to the latter.

In particular, as mentioned, the software is configured to process the request sent by the sender device and thus return a structured data packet 40 in a format suitable for data exchange. Preferably, the data packet 40 is in "json" format but could also be in other formats, such as for example "yaml" or "xml".

In particular, the data packet 40 contains a series of fields 42 to which the values 38 of the fields of the data structure 20 sent by the sender device 4 are appropriately assigned and/or to which values are automatically obtained from the software. Preferably, the data packet 40 comprises the data of the message 60 created by the sender and necessary to correctly transmit this message to the receiver and to allow the latter to display the message 60 on his device.

More in detail, as shown in FIG. 4, the structured data package 40 includes the following fields:

an ID 42 field which uniquely identifies the data packet 40 (i.e. the "fieldIDmessage") and which is automatically implemented by the software by assigning a random or predetermined number or alphanumeric code, a sender field 44 (i.e. the "fieldMessageFrom") and to which the value of the sender field 22 of the data structure 20 is assigned or, preferably, the value of the ID identification code of the corresponding sender user obtained from the central unit 8 starting from the encrypted computer object Y, as preferably provided in the authentication procedure described above and represented in FIG. 12, a receiver field 46 (i.e. the "fieldMessageTo") and to which the value of the receiver field 24 of the data structure 20 is assigned, a field 48 relating to the body of the message (i.e. the "fieldMessageBody") and containing the value 38 of the message text field 26 of the data structure 20 and, preferably, also the label 49 of this field; advantageously, the message body field 48 also contains both the label 49 and the corresponding values 38 of the avatar identification field 34 and of the balloon identification field 32 of the data structure 20.

In essence, the structured data package 40 contains a body field message 48, which contains both the labels 49 (i.e. the metadata) of the message text fields 26, avatar identifier 34 and balloon identification 32 of the data structure 20, and the corresponding values 38 (i.e. the data) assigned to these fields within the structure itself.

Advantageously, the structured data packet 40 also comprises a field to which the corresponding date and/or time values are assigned in which the message 60 was sent by the sender device 6 and/or in which the central unit 8 received the data structure 20.

The first software module loaded and executed in the receiver device 6 is configured to download from the central unit 8 a structured data package 40 prepared by said unit and destined for said device. Preferably, the download from the central unit 8 of the structured data packet 40 from the receiver device 6, or in any case the transmission of the structured data packet 40 from the central unit 8 to the receiver device 6, is carried out using a REST (REpresentational State Transfer) architecture using preferably, but not necessarily, on the HTTPS protocol.

Advantageously, the first software module loaded and executed in the receiver device 6 can be configured to periodically access, according to a predefined frequency, to the central unit 8 to query it for the possible presence/availability of one or more structured data packets 40 (i.e. messages) intended for it—therefore following a client-server dialogue mode called "polling"—and, if so, download from the central unit 8 this structured data packet 40.

Preferably, as represented in FIG. 1, the system 2 according to the invention also includes a notification platform 50, such as for example Google Cloud Messaging or Apple Push Notification Service, which acts as a mediator between the devices 4, 6 and the central unit 8 and which is configured to notify said devices, asynchronously, when the central unit provides new data for them, therefore following a method called "push notification". In particular, for this purpose, the software is also configured so that, after processing and preparing the structured data packet 40 on the basis of the data structure 20 sent by the sender device 4, it sends a notice 52 to the notifying platform 50, which is then configured to forward this warning to the corresponding receiver device 6. Suitably, the notice 52 which the central unit 8 sends to the notifying platform 50 comprises an identification code of the central unit 8 which sends the notice, the identification code of the receiver device 6 to which the notice must be sent and the content of this notice 52. Suitably, the content of that notice, which is sent to the receiver device, includes at least field 42 which uniquely identifies the structured data packet 40, so as to allow the receiver device 6 which received this notice 52 to query the central unit 8 in order to download the structured data packet 40 identified by this code.

It is also understood that, in an embodiment not shown here, the notice 52 sent by the central unit to the notifying platform 50, and from this to the receiver device 6, includes the entire structured data packet 40. In other words, the central unit 8 immediately sends to the receiver device 6, via the platform 50, the entire structured data packet 40, which is thus downloaded locally from the device itself without having to directly interrogate the central unit 8.

Preferably, the first software module loaded in the sender 4 and/or receiver 6 devices is configured to have a first active state, in which a bidirectional connection with the central unit 8 is established and maintained, and a second rest state, in which the sender 4 and/or the receiver 6 device are not connected to the central unit 8. Advantageously, the first software module is also configured so that, when it is in said first active state, the receiving device 6 interrogates the central unit 8 not periodically (i.e. according to the "polling" mode), but only when it receives a notice 52, preferably through the notification platform 50 and according to the mode called "push notification". Suitably, correspondingly, when new data destined for a certain receiver device 6 in which the first software module is in an active state are available in the central unit 8, the software is configured to send to said receiver device 6 a notice 52 to interrogate the central unit 8.

Conveniently, when new data destined for a certain receiver device 6 in which the first software module is in a rest state are available in the central unit 8, the software is also configured in such a way to send a notice 52—preferably through the notifying platform 50 and according to the mode called "push notification"—to said receiver device 6 so as to notify it to go to the first active state.

Basically, in doing so, the central unit 8 is interrogated only when there is new data to download, thus avoiding to interrogate it periodically and unnecessarily; this is particularly advantageous in that it allows to decrease data traffic and above all to avoid unnecessarily consuming the data transmission band.

Advantageously, the sender 4 and/or the receiver 6 device comprises:

a first local memory 90, in which to download and store the identification codes 30 of all the graphic and/or audio elements 31 which are associated (through a relationship 18) with the identification code of that user who has logged in to the system messaging 2 using said sender 4 and/or receiver 6 device, a second local memory 91, in which to download and store all the graphic and/or audio elements 31 corresponding to the identification codes 30 downloaded and stored in the first memory.

Advantageously, the graphic and/or audio elements $31^Y$ are downloaded and stored in the second local memory 91 having dimensions and/or degree of detail $D_2$. In particular, miniaturized images (thumbnails) $31^Y$ are downloaded and stored in the second local memory 91 with resolution $R_2$.

Preferably, the first and second local memories are both mass memories or primary memories or RAM memories. Preferably, the second local memory 91 is of the cache type.

In particular, as represented by the flow chart of FIG. 13, the first software module loaded and executed in the sender 4 and/or receiver 6 device and the software loaded in the central unit 8 are also configured so that:

the first software module of the sender device 4 sends to the central unit 8 the data (username and password) that the user enters, acting on his device 4 and/or 6, when he logs in to the messaging system 2, the software of the central unit 8 verifies the log-in data thus received (i.e. it checks—preferably by querying the user dataset 14—if together they correspond to a user already registered to the messaging system), extracts the ID identification code of the correspondent user and, using the code thus extracted, identifies the unique identification codes 30' of all the graphic and/or audio elements 31' which are associated, through a relationship 18, with the ID identification code of this user, the first software module of the sender device 4 downloads to the first local memory 90 of the device 4 and/or 6 the unique identification codes 30' of all the graphic and/or audio elements 31' thus identified, the first software module of the sender device 4 downloads the graphic and/or audio elements 31' thus identified to the second local memory 91 of the device 4 and/or 6.

Preferably, these operations are carried out at the time of the first use of the messaging system 2, once the first software module (APP) has been downloaded and installed in the sender 4 and/or receiver 6 device. Conveniently, in this way, preliminary synchronization of the sender 4 and/or receiver 6 device is carried out.

Conveniently, the first software module of the sender 4 and/or receiver 6 device is configured so as to display on the display of the device itself a typing/insertion keyboard 77—and this in order to create a message to be sent—which has access, and therefore displays on said display, only to the graphic and/or audio elements 31' whose unique identification codes 30' are stored/present in the first memory of the device itself.

Suitably, the first software module which is executed in the sender device 4 is configured to carry out these operations:

recover the list of unique identification codes 30' present in the first local memory 90 of the sender device 4, using these codes 30', recover the corresponding graphic and/or audio elements 31' from the second local memory 91 of the sender device 4, displaying the graphic and/or audio elements 31' thus recovered in the typing keyboard 77 of the sender device 4.

Advantageously, in the typing keyboard 77 the graphic and/or audio elements $31^Y$ having dimensions and/or degree of detail $D_2$ are displayed, in particular in the typing keyboard 77 miniaturized images are displayed (thumbnail) $31^Y$ with resolution $R_2$.

The first software module loaded and executed in the receiving device 6 is also configured to process the structured data packet 40 that has been downloaded from the central unit 8 so as to extract/decode the contents of the fields 42, 44, 46 and 48 of that package.

In particular, this software module is configured to perform a parsing operation of the content of the message body field 48 of the structured data packet 40 so as to obtain the values 38 of the message text fields 26, balloon identification 32 and/or avatar identification 34.

More in detail, the first software module is configured for:

search—directly within the message body field 48 of the structured data packet 40 and/or within the value 38 of the text field 26, once the latter has been identified with its label 49 inside the body field message 48—the precoded labels/characters/symbols 28 so as to identify the unique codes 30 of the graphic elements, checking whether the graphic elements 31 identified by the extracted unique codes 30 are already present in the local memory of the receiver device 6; preferably, for this purpose, it searches for the unique identification codes 30' present in the first local memory 90 of the receiver device 6 and, if they are not already present in the local memory of the receiver device 6, sends a request to the control unit 8, so as to download to the local memory of the receiver device 6—preferably in the second local memory 91 of the receiver device 6—the graphic elements 31" identified by the unique codes 30 identified in the structured data package 40 and not present in the first local memory 90.

Advantageously, in the second local memory of the receiver device 6—preferably in the second local memory 91 of the receiver device 6—the graphic and/or audio elements 31 are downloaded and stored Y''' having dimensions and/or degree of detail D2. In particular, images 31 are downloaded and stored in the second local memory $91^{Y'''}$ miniaturized (thumbnail) with resolution R2.

Advantageously, in the typing keyboard 77 the graphic and/or audio elements $31^Y$ are displayed having dimensions and/or degree of detail D2. In particular, in the typing keyboard 77 miniaturized image (thumbnail) $31^Y$ with resolution $R_2$ are displayed.

Conveniently, therefore, the graphic and/or audio elements 31 are also stored in the second local memory 91 of the receiver device $6^{Y'''}$, having dimensions and/or degree of detail D2, which are downloaded upon receipt of a certain structured data packet 40 and this in order to always correctly display all the graphic and/or audio elements contained in the received message.

More in detail, therefore, in the second local memory 91 of any device 4 and/or 6 the following are memorized/conserved:

a first set of graphic and/or audio elements 31' of which the unique codes 30' are stored/present in the first local memory 90; in particular, these are the graphic and/or audio elements 31' which, within the central database 12, are associated with a specific user by means of a relationship 18 in view of the fact that this user created/loaded them into the messaging system or because it has been authorized/authorized to use them (for example through direct or indirect purchase), a second set of graphic and/or audio elements 31" of which the univocal codes are not instead stored/present in the first local memory 90; in particular, these are the graphic and/or audio elements 31 which have been downloaded from the central unit 8 upon receipt of a certain structured data packet 40 and this in order to correctly display all the graphic and/or audio elements contained in the received message.

Conveniently, both the first set of graphic and/or audio elements $31^Y$ and the second set of graphic and/or audio elements $31^{Y'''}$ have dimensions and/or degree of detail $D_2$. In particular, both said first and second set includes miniaturized images (thumbnail) $31^Y$ with resolution $R_2$.

Conveniently, as mentioned, the first software module of the sender 4 and/or receiver 6 device is configured so as to show a typing/insertion keyboard on the display of the device itself 77—and this in order to create a message to be sent—which has access, and therefore displays on said display, only the first set of graphic and/or audio elements 31' present in the second local memory 91 of the device.

This is particularly advantageous as it allows to have a messaging system in which the user can use in the messages to be sent only the graphic and/or audio elements created by him or which he has been authorized/enabled the use (for example following a purchase), while at the same time it can always and correctly display all the graphic and/or audio elements present in the messages it receives.

Conveniently, more in detail, the request—which is sent by the receiver device 6 to the central unit 8 in order to download a graphic and/or audio element whose identification code 30 is not present in the first local memory 90 of the device itself—contains the univocal code 30 of this graphic and/or audio element, code which is then used by the software module of the central unit 8 to query the database 12 and extract from the elements dataset 16 the data of the graphic element uniquely identified with this code 30. Then, the data of the graphic element thus identified, and in particular the graphic and/or audio element $31^Y$ having dimensions and/or degree of detail $D_2$ and associated with the identification code 30 identified, are sent from the central unit 8 to the requesting device.

Conveniently, for this purpose, the first software module of the requesting device is configured to send a request to the central unit 8 and thus download to the local memory of the requesting device, and in particular to the second local memory 91, the graphic element $31^{Y'''}$ having dimensions and/or degree of detail D2 (and in particular the image having resolution R2) identified by the univocal code 30 present in the message body field 48 of the structured data packet 40. Preferably, the request to the control unit panel 8 is sent using the POST method of the HTTPS protocol or is implemented using the GraphQL language of the MQTT protocol on WebSocket technology.

Preferably, the graphic element $31^{Y'''}$ can be an image 33 having resolution R2 to be inserted, with or between any text 39, inside the balloon (frame) 37 of message 60, preferably but not necessarily to represent in a stylized way at least a concept, an idea, an object, a mood or an emotion in a way substantially corresponding to the emoji®.

Conveniently, the first software module loaded and/or executed on the receiver's device 6 is configured to display the graphic and/or audio element $31^{Y'''}$ of size and/or degree of detail D2 inside the received message 60 balloon 37 alone (if no text is provided) or with or between text 39 of the message itself. Preferably, inside the balloon 37 of the received message 60 the graphic and/or audio element $31^{Y'''}$ of size and/or degree of detail D2 is displayed in line with the text 39 of the message itself.

In particular, suitably, the first software module loaded and/or executed on the receiver's device 6 is configured to implement on the display of said device a first screen 80 in which the exchange of messages is displayed and, inside the balloon 37 of one or more of said messages, the graphic element 31 is displayed Y''' of size and/or degree of detail D2.

Suitably, the first software module loaded and/or executed on the receiver's device 6 is configured so that the screen 80 in which the exchange of messages is displayed is defined by a first computer object VIEW configured to occupy the entire display of the receiver device.

Conveniently, the first software module loaded and/or executed on the receiver's device 6 is configured so that, within the first screen 80 for displaying the message exchange 60, the graphic element $31^{Y'''}$ which is represented inside the balloon 37 of the message 60 occupies a display area 81 which is selectable by touch 82 (with the fingers and/or with a device, for example a stylus), preferably by a short touch ("tap"), or by clicking, for example with a pointer (mouse), or through another external event (or action) of activation.

Preferably, the display area 81 which is occupied by the graphic element $31^{Y'''}$ is selectable by a user touch 82 which can have a predefined duration, for example of 1 second, or can be prolonged, or still can be also a dynamic touch (e.g. drag, pinch, rotation, swipe, pinch-unpinch).

Suitably, the first software module is configured so that, when the structured data package 40 contains precoded labels/characters/symbols 28 which appropriately signal the presence of graphic elements within the message, create within the first screen 80, defined from the first VIEW computer object, a second VIEW computer object. In particular, this second computer object VIEW is configured to occupy, within the specific position of the message displayed on the screen, a display area 81 corresponding to or slightly larger than the size of the graphic element $31^{Y'''}$ to be displayed and, in particular, corresponding to the dimensions and/or degree of detail $D_2$ of said element. More in detail, the second computer object VIEW is configured so as to contain inside it the graphic element $31^{Y'''}$ of resolution $R_2$ which is thus visualized/implemented within the display area 81 occupied by said second computer object.

Suitably, the first software module is configured so that, following the touch 82 or the click or other external activation event (action) carried out on the display area 81 occupied by the graphic element $31^{Y'''}$ of resolution $R_2$, start a corresponding action 84.

Advantageously, this action 84 provides for activating the reproduction of an audio or video element which is associated with said graphic element $31^{Y'''}$ of resolution $R_2$.

Advantageously, this action 84 provides for automatically creating and displaying a second screen 85 on the display of the device itself.

Advantageously, this action 84 provides for automatically displaying on the display of the device itself a second (further) screen 85 in which a graphic element $31^{Y''''}$ having content corresponding to that of element $31^{Y'''}$ and a resolution R3 greater than R2.

Preferably, in this second (further) screen 85, graphic element $31^{Y''''}$ is implemented/displayed with resolution $R_3$ which is greater than resolution $R_2$ and can suitably be equal to or lower than resolution $R_1$. Preferably, resolution $R_3$ is greater than resolution $R_2$ but is slightly lower than resolution $R_1$.

Suitably, the first software module loaded and/or executed on the receiver's device 6 is configured in such a way second (further) screen 85, in which the graphic element 31 is displayed Y''' at a resolution $R_3$ greater than $R_2$, is defined by a third computer object VIEW which is configured to occupy a large part or the whole display of the receiver device 6 and which contains said graphic element 31$^{Y'''}$ at a higher resolution than $R_2$.

Conveniently, in this second (further) screen 85 the graphic element 31 Y''' is displayed at a resolution $R_3$ having a horizontal or vertical dimension which at most corresponds to the aforementioned resolution $R_1$ and, preferably, at most corresponds to the resolution with which the original/initial image is loaded into the messaging system 2 by the author of the image itself or by another subject.

Preferably, in this second (further) screen 85, the graphic element 31$^{Y'''}$ is implemented/displayed with resolution $R_3$ enlarged with respect to the resolution $R_2$ of the graphic element 31$^{Y'''}$ and is also implemented/displayed together with other information relating to said graphic element, such as for example the author's data, the number of purchases of this element, etc.

Preferably, in this second (further) screen 85, in addition to the graphic element 31$^{Y'''}$, an indicator is also implemented, for example a hypertext link 79, the activation of which by touch or click refers to a dedicated section where it is it is possible to purchase and/or download said graphic element.

Advantageously, the first software module loaded and/or executed on a certain device, preferably on the receiver device 6, is configured to request from the central unit 8 the creation of a graphic and/or audio element having a degree of detail $D_x$ suitable to be implemented by said device 6 and, once this graphic and/or audio element has been created, to download it locally in said device so as to implement it. Preferably, the first software module loaded and/or executed on the device, preferably on the receiver device 6, is configured to request from the central unit 8 the creation of a graphic element having resolution $R_x$ suitable for the display of said device 6 and, once this graphic element has been created, to download it locally in said device so as to view it on its display.

Conveniently, for this purpose, the first software module executed by the sender 4 and/or receiver 6 device and the software loaded and executed in the central unit 8 are configured to implement the following procedure:

the sender 4 and/or receiver 6 device sends a request (query) 86 to the central unit via the first software module, also containing data 87 of the size/resolution of the display of said device 6 in which the first software module is executed, the central unit software is configured to create, starting from the graphic and/or audio element of dimensions and/or degree of detail $D_1$ and on the basis of data 87 relative to the dimensions/resolution of said display, a corresponding graphic and/or audio element 31$^X$ of size and/or degree of detail $D^x$ which is less than $D_1$ and is specifically suited to the size/resolution of said display, the graphic and/or audio element 31$^X$ with dimensions and/or degree of detail $D_x$ thus created by the software of the central unit 8 is downloaded locally to said sender device 4 and/or receiving device 6 in order to be implemented by the latter.

Suitably, the first software module is configured to carry out this procedure to create the graphic and/or audio element 31$^{Y'''}$ to be implemented within the first screen 80 for displaying the message exchange and which defines an area 81 selectable by touch 82 or click. In particular, according to the embodiment shown in FIG. 21, the graphic and/or audio element 31$^X$ with dimensions and/or degree of detail $D_x$ can correspond to the graphic and/or audio element 31$^{Y'''}$ with dimensions and/or degree of detail D2 (preferably resolution R2) which is displayed/implemented within the selectable area 81 provided in the first screen 80. Preferably, the graphic and/or audio element 31$^X$ with dimensions and/or degree of detail Dx is loaded in the second computer object VIEW and is inserted inside the balloon 37 in line with the text 39 of the message 60.

Suitably, the first software module is configured to carry out this procedure in order to create the graphic and/or audio element 31$^{Y'''}$ to be implemented inside the second (further) screen 85 which opens on the display following the touch or click made on the selectable area 82 of the first screen 80 for displaying the messages exchange. In particular, according to the embodiment shown in FIG. 21, the graphic and/or audio element 31$^X$ with dimensions and/or degree of detail $D_x$ can correspond to the graphic and/or audio element 31$^{Y'''}$ with dimensions and/or degree of detail $D_3$ (preferably resolution $R_3$) which is displayed/implemented within the second (further) screen 85. Basically, in this case, the graphic and/or audio element 31$^X$ with dimensions and/or degree of detail $D_x$ is implemented (represented) in the second (further) screen 85.

Correspondingly, the software of the central unit 8 is configured to correspondingly create an avatar image 35 and/or to define the balloon size 37 on the basis of data 87 relating to the size and/or the resolution of the display of the device 6 which sent a request 86 through the first software module. Suitably, therefore, the avatar image 35 and/or the balloon 37 thus created are downloaded from the device to be implemented and used correspondingly within the first screen 80 for displaying the exchange of messages.

Advantageously, by computer object "VIEW" is meant a container that supports a certain layout inside it and that defines the basic element for building a graphical interface.

Correspondingly, the first software module is configured to request and download from the central unit 8, if they are not already present in the local memory of the receiver device, the avatar image 35 corresponding to the avatar identifier 34 and/or the balloon type 37 corresponding to the balloon ID 32 contained in the message body field 48 of the structured data package 40 downloaded from the central unit 8.

Conveniently, the avatar identification code 34 and/or the balloon identification code 32 can be managed, as described above, by means of specific fields of the data structure 20 or they can be inserted directly into the text field 26 of said data structure suitably positioned between precoded labels/characters/symbols 28. Conveniently, to pass within the text field 26 of the data structure 20, in addition to the values of the images 33 to be displayed together with the text 39 inside the balloon, also the different values of the avatar ID 34 and the values of the balloon ID 32 can use different precoded labels/characters/symbols 28, such as "& #", "& %" and "& ^".

Based on the content of the fields of the structured data package 40 and using the image 33 to be inserted together with the text inside the balloon, the avatar image 35 and/or the balloon image 37—which are already present in the local memory of the receiver device 6 or which have been downloaded by the latter by appropriately interrogating the central unit 8—the first software module is configured to properly compose and display, on screen 62 of the display of the receiver device 6, a message 60 with the corresponding graphic elements, such as the image 33 to be inserted in the balloon, the avatar image 35 and/or the balloon image 37.

In particular, as represented in FIG. 9, in the display screen of the receiver device 6, the image 33 is displayed together with the text 39 of the message 60 inside the particular balloon 37 chosen by the sending user. Furthermore, in the screen 62 of the display of the receiver device 6, the balloon 37 is positioned close to and/or is graphically connected to the image of the avatar 35 used by the sending user in that conversation.

It is also understood that the system 2 described above can provide for the management/personalization/selection of only the images 33 to be inserted together with the text 39 of the message 60 or also only of the avatar images 35 or balloon 37.

It is also intended that the message 60 managed by the messaging system 2 can present only text 39 or only graphic and/or audio elements 31 (in the form of images that can be inserted by themselves inside the balloon, an empty balloon, or avatar images without a balloon) or, preferably, a suitable combination of text 39 and said graphic and/or audio elements 31.

The operation of the messaging system described above provides for a sequence of phases, which are listed and described below.

Advantageously, in order to use the messaging system, the user must first download and install the first software module on a device 4 and/or 6.

Suitably, the user must execute the first software module on said device, log-in so as to activate the synchronization phase of the device and thus download locally (preferably respectively in the first local memory 90 and in the second local memory 91) the unique identification codes 30' associated with the unique identification of the user who logged in and the graphic and/or audio elements 31' uniquely identified by said codes 30'.

Conveniently, by logging in to the messaging system 2, the control and authentication procedure is also activated as described above and preferably represented in the flow chart of FIG. 12.

Preliminarily, by acting on the input means of the graphic interface of the sender device, the user, in addition to defining the text 39 of the message 60, selecting/choosing the avatar 35 (see FIG. 5) and/or the balloon 37 (see FIG. 8) to be used for that message, as well as select/choose the image/symbol 33 to be included in that message (see FIG. 7).

Based on what is defined and entered by the user, the first software module of the sender device 4 generates the data structure 20, appropriately assigns the corresponding values 38 to the fields 22, 24, 26, 32, 34 and 36 of the latter, and sends to the software of the central unit 8 a request containing the data structure thus created.

Suitably, the software processes the request sent by the sender device 4 and prepares a structured data packet 20 in a format suitable for data exchange.

Furthermore, on the basis of the receiver identification code 24, the central unit 8 prepares and sends a corresponding notice 52 to the notifying platform 50, to which the receiver device 6 belongs.

Conveniently, in the case of multiple receiver, for each receiver identification code 24, the central unit 8 sends a corresponding notice 52 to the notifying platform 50, to which each receiver device belongs 6.

The content of the notice 52 is then sent from the notifying platform 50 to the receiver device 6, which then uses the content of that notice to interrogate the central unit 8 directly and to download the corresponding structured data package 40 prepared by the software and intended for the scope.

In the absence or in addition to the notice 52 sent by the notifying platform 50, the first software module can periodically access the central unit 8 to query it for the possible presence/availability of one or more structured data packets 40 (i.e. messages) intended for it and, if so, to download this structured data packet from central unit 8.

Then, once the receiver device 6 has downloaded the structured data packet 40, the first software module loaded and executed in said device processes the latter and decomposes it so as to extract/decode the contents of the fields of this packet 40. In particular, the values of the message text field 26 and of the balloon identification 32 and/or avatar identification 34 fields are extracted from the message body field 48 of the structured data packet 40.

More in detail, by searching for the precoded labels/characters/symbols 28 inside the text field 26 the unique codes 30 of the graphic and/or audio elements 31 are identified and, if these were not already present in the local memory of the receiver device 6, the first software module sends a request to the central unit 8 which, after having interrogated the corresponding database 12, extracts and sends to the receiver device 6 the corresponding graphic and/or audio element 31, which is then stored in the local memory of the receiver device 6 so as to be easily available locally in case of further and possible subsequent uses.

Conveniently, in the event that the unique codes 30 of the graphic and/or audio elements 31 are already present in the local memory of the receiver device 6, the first software module does not send any request to the central unit 8.

Correspondingly, the avatar identifier 32 and/or the balloon identifier 34 are extracted from the field message body 48 of the structured data packet 40 and/or by searching for appropriate precoded labels/characters/symbols 28 within the text field 26 of the data structure 20 and, in the if these were not already present in the local memory of the receiver device 6, the first software module sends a request to the central unit 8 which, after having interrogated the corresponding database 12, extracts and sends to the receiver device the corresponding avatar images 35 and/or balloon 37.

Finally, based on the content of the fields of the structured data package 40 and using the image 33 to be inserted together with the text inside of the balloon, the avatar image 35 and/or the balloon image 37—which are already present in the local memory of the receiver device 6 or which have been downloaded to the latter by appropriately interrogating the central unit 8—the first software module is configured to properly compose and display, on screen 62 of the display of the receiver device 6, the message 60 with the corresponding graphic elements, such as the image 33 to be inserted in the balloon, the avatar image 35 and/or the image balloon 37 (cf. FIG. 9).

Preferably, the messaging system 2 is of the instantaneous and asynchronous type and, suitably, it can be used both between portable devices, such as smartphones and tablets, and via computers that access a suitable portal/website (see FIG. 10).

Suitably, the messaging system 2 is a network communication system, preferably via the internet and/or in a local network. Preferably, the messaging system 2 is of the instantaneous type and is based on the internet. Preferably, the messaging system 2 is of the type that does not use the GSM network and does not require/use a cellular network.

Preferably, the sender device 4 and the receiving device 6 are configured to have an internet connection.

Preferably, the first software module of the sender device 4 and of the receiving device 6 is a dedicated software which, suitably, is downloaded from the network via the internet.

Conveniently, the messaging system 2 is configured to send the same text messages 60 from a sender device to a plurality of devices receiving a same chat. In particular, it is of the type in which you can create a chat with three or more sender devices and/or three or more receiver devices.

Suitably, the messaging system 2 can manage text messages without character limits (such as, for example, the limit of 160 characters per message provided for SMS) or of size (such as, for example, the limits of 300 or 600 kB foreseen for MMS).

Advantageously, according to the invention, by acting on a device 4 or 6, the author of a certain graphic element loads said graphic element 31 with resolution R into the central unit 81 and, suitably, inside said central unit 8 such graphic element is stored with resolution $R_1$; advantageously, in the central unit 8 a corresponding graphic element $31^Y$ is created and stored with the same content but with a resolution $R_2$ lower than $R_1$.

Advantageously, when a user of the messaging system requests to download locally—subsequently of a purchase or free of charge—a graphic element 31, the central unit 8 creates a graphic element $31_X$ of resolution $R_x$ (corresponding to the size and/or degree of detail $D_x$)—preferably of resolution $R_2$—which is correspondingly and suitably defined on the basis of data 87 relating to the size and/or resolution of the display of the device which made the request 86 for local download.

Conveniently, the graphic element of resolution $R_x$—preferably of resolution $R_2$—is displayed inside the typing keyboard 77 which is implemented on the display of the sending user's device and also, once selected and inserted in a message, it is implemented within the first screen 80 for displaying the message exchange.

Advantageously, inside said screen, the graphic element $31^Y$ of resolution $R_2$ and/or the graphic element $31^X$ of resolution $R_x$ is displayed inside a message 60, preferably in line with any text 39 of said message.

Suitably, the sending user acting on the first screen 80 for displaying the message exchange—which is implemented on the display of said first device 4 managed by the sending user—can click or touch (preferably by means of a "tap" touch 82) the area 81 of the display which, within the message 60, is occupied by the graphic element $31^Y$ of resolution $R_2$ and, in doing so, causes the creation and display of a second (further) screen 85—which is always implemented on the display of said first device managed by the sending user—in which, the same graphic element $31^Y$ clicked/touched in the first display screen, is displayed with resolution $R_3$.

Conveniently, if the graphic resolution element $R_3$ is not already present locally in the first device 4 of the sending user, the first software module executed in said first device sends a request to the remote unit 8 (also containing the data 87 relating to the dimensions and/or resolution of the display of said first device) to create a graphic element $31^Y$ having a resolution enlarged and suitable (preferably corresponding) to the dimensions of the display of said first device.

Suitably, therefore, based on the data 87 relating to the size and/or resolution of the display of said first device, the remote unit 8 thus creates the graphic resolution element $R_3$ which is then downloaded from said first device and, through said first software module, implements it and displays in said second (further) screen 85 implemented in the display of the first device 4.

Correspondingly, the receiver user acting on the first screen 80 for displaying the exchange of messages—which is implemented on the display of said second device 6 managed by the receiver user—can click or touch (preferably by means of a "tap" 82) the area 81 of the display which, within the message, is occupied by the graphic element $31^{Y'''}$ of resolution $R_2$ and, in doing this, causes the creation and display of a second (further) screen 85—which is always implemented on the display of said second device 6 managed by the receiver user—in which the same graphic element clicked/touched in the first display screen 80 is displayed with resolution $R_3$.

Conveniently, if the graphic element $31^{Y'''}$ of resolution $R_3$ is not already present locally in the second device of the receiver user, the first software module executed in said second device 6 sends a request 86 to the remote unit 8 (also containing the data 87 relating to the size and/or resolution of the display of said second device) to create a graphic element $31^{Y''}$ having an enlarged resolution and suitable (preferably corresponding) to the size of the display of said second device 6. Conveniently therefore, on the basis of the data 87 relating to the size and/or resolution of the display of said second device 6, the remote unit 8 thus creates the graphic element $31^{Y''''}$ of resolution $R_3$ which is then downloaded from said second device and, through said first software module, implements it and displays in said second (further) screen 85 implemented in the display of the second device 6.

The invention has been des in particular for graphic elements (images), however it is understood that the same configuration and operation also applies to audio or video elements.

Advantageously, according to the invention, an IT platform is also implemented in the central unit 8, which interfaces and communicates with the devices of the users registered in the messaging system 2 described, and which is configured to act as a market in which the users "Users" of the messaging system can download locally on their device—following a purchase (i.e. in exchange for a fee or "fee", preferably via virtual currency) and/or free of charge—one or more of the graphic and/or audio elements present within the messaging system.

Furthermore, the IT platform is configured so that users who register to the messaging system 2 as "authors" (or "artists") can create and display pages within the platform itself, which essentially act as showcases, in which the graphic and/or audio elements created by them are represented, preferably collected in collections. Advantageously, the pages displayed on the platform can have a predefined deadline, in order to thus define a sales campaign.

Correspondingly, the users of the messaging system 2 access the IT platform through their devices in order to view the showcase pages of the various "author" users. Once one or more graphic and/or audio elements have been selected, the "user" user, in exchange for a fee and/or free of charge, is enabled to use and manage these graphic and/or audio elements. In particular, for this purpose, as already mentioned, a database 18 is created at database level 12 which associates the buyer user "user", identified in dataset 14, with the graphic and/or audio elements of dataset 16 chosen by him and acquired. Suitably, the "user" user downloads them locally to the device he is working on and/or also to the other devices associated with him.

Advantageously, the aforementioned IT platform comprises a section, for example a blog, in which the "author" users and the "user" users of the messaging system can interact with each other. Suitably, the aforementioned IT platform includes a section, in which the users of the messaging system commission one or more "authors" users to create a desired graphic and/or audio element.

Suitably, these downloadable and obtainable graphic elements from the platform may include images to be inserted inside the balloon (corresponding to the emoji type illustrations®) and/or the balloons themselves and/or images to be used as avatars. Advantageously, the graphic elements also comprise a graphic representation (for example a cockade, a scarf, a hat, etc.) to be added as an accessory in the avatar image or also in the image that can be inserted inside the balloon.

Suitably, the IT platform is configured so as to send a first portion of the fee, which was paid by the user to purchase the graphic and/or audio elements from the platform, preferably to purchase the graphic representations to be added as an avatar image accessory, to the author or to the subject who made these graphic elements available within the platform, while another portion of said consideration is sent to the manager of the entire IT platform. Suitably, the IT platform is configured to collect/bring together the shares—which are intended for the operator of the platform itself—of the fees paid by users for the purchase of particular graphic and/or audio elements, in order to then allocate them to a single entity, preferably to an entity with solidarity, social and/or humanitarian purposes.

Conveniently, as shown in FIG. 22, in the second (further) screen 85, in addition to the graphic element $31^{Y'''}$ of resolution $R_3$, any keywords associated with it and/or other graphic elements of the same collection can be displayed as group 91 (preferably identified by means of a further and corresponding graphic element) to which said graphic element $31^{Y'''}$ belongs.

Conveniently, as shown in FIG. 23, inside the second (further) screen 85, in addition to the graphic element $31^{Y''''}$ of resolution $R_3$, further contents associated with said graphic element $31^{Y''''}$ can be displayed. For example, links may be displayed to internet pages related to the content itself or additional pages within the application, for example pages where the creator of the content may have inserted his creations and/or personal information, or links to pages containing other collections similar to the one/s of which the content itself is a part. Alternatively, and/or in addition there may be links to pages that offer promotions and/or discounts and/or commercial offers on products relating to and/or connected to the content of the graphic element $31^{Y''''}$ displayed in said second (further) screen 85.

Advantageously, the association of each graphic element 31 with further contents or with the links to further internet pages, as well as the modification of the data associated with each graphic element 31, can be carried out, within the platform, by means of a specific screen. Conveniently, for example, once the graphic element has been selected, a popup window 92 opens to modify the data relating to the selected graphic and/or audio content 31.

Advantageously, within the IT platform the graphic and/or audio contents 31 can be grouped into various groups ("collections") by using specific keywords ("tags") which can be assigned to each graphic content and/or audio 31.

It is also understood that the above also applies if the graphic and/or audio element with dimensions and/or degree of detail $D_1$ is in a first format, while the graphic and/or audio element ($31^Y$, $31^{Y'''}$, $31^{Y''''}$, $31^X$) having dimensions and/or degree of detail $D_2$, $D_3$ and/or $D_X$ is in a second format which is different from said first format. In particular, in this case, in the database 12 and/or 47 of the central unit 8 the graphic and/or audio elements 31 with dimensions and/or degree of detail $D_1$ are in a first format and, moreover, the software which is loaded and executed in said at least one central unit 8 is configured to create, starting from the graphic and/or audio element which is in said first format and which is loaded inside said at least one database 12 and/or 47, at least one corresponding graphic and/or audio element ($31^Y$, $31^{Y'''}$, $31^{Y''''}$, $31^X$) which has dimensions and/or degree of detail $D_2$, $D_3$ and/or $D_x$ and which is in a second format which is different from said first format.

The messaging system and the method according to the invention are considerably advantageous in that:

they allow the user to successfully transmit customized graphics and/or audio elements to a messaging system, they allow the successful transmission and display of graphics and/or audio which, at the time of sending the message, are not necessarily present in the receiver's device, using a single central unit in which all the graphic and/or audio elements are uniquely identified, as well as the implementation of a first module software that, when the graphic and/or audio elements are not present locally on the device, promptly downloads the corresponding graphic and/or audio elements from the central unit 8, it is ensured that these elements are always implemented/displayed correctly and completely within the message, as well as ensuring that they are implemented in the same way between the sender and the receiver, downloads the creation of the graphic and/or audio element locally on a certain device occurs only the first time, since, once downloaded, the element itself is stored in the local memory of the device; in particular, the fact that this download does not happen always or continuously, allows to speed up the loading of the message data, to save/optimize data traffic for the devices and to decrease the number of calls to the central unit, thus reducing both the computational processing that the band occupied, allows each user—in particular thanks to the structure of the database—to have available in the preparation of the messages to be sent only the graphic and/or audio elements associated with him (and for which he is therefore authorized/enabled status, for example as an author and/or buyer) and, at the same time, allows one to always display any graphic and/or audio element provided in the messages received correctly, completely and unambiguously, the structure of the database ensures that the user downloads all the graphic and/or audio elements locally on each device only when registering this device to the messaging system or the download/setting/first use of this module within this device, thus making the synchronization of each device associated with that particular user particularly quick and simple, allow the user to create graphic and/or audio elements to be shared and made available to other users, allow the user to use a different avatar image and/or balloon for each message, allow the user to insert personalized/customizable balloons images (corresponding to the emoji type illustrations®) in turn personalized/customizable, both with and without the presence of text inside the balloon itself, the graphic and/or audio elements, as well as the avatar and/or images balloons are not sent with the message nor are they attached to it; in particular, the fact of using unique identification codes that are inserted as text within the structured data package allows to reduce data traffic and therefore the network bandwidth to be used for the exchange of the message, the graphic and/or audio elements are displayed in an optimized and adapted way according to the display of the sender and/or receiver's device, allows to view in an enlarged and optimized way a graphic element inserted and displayed within a message simply by touching the occupied display area from this graphic element; conveniently, from the enlarged version of the graphic element it is possible to grasp and appreciate the creative details of the element itself.

The invention claimed is:

1. A messaging system comprising:
a sender device and a receiver device each having a processor and respectively configured to send and receive text messages; and
a central unit having a processor and communicating with the sender device and the receiver device, wherein:
said central unit comprises or is associated with a database containing data related to all graphic and/or audio elements which the messaging system is configured to manage, said graphic and/or audio elements being loaded inside said database with first dimensions and/or degree of detail;
software is loaded and executed in said central unit, the software being configured to create, starting from the graphic and/or audio elements with the first dimensions and/or degree of detail loaded inside said database, at least one corresponding second graphic and/or audio element having a same content but smaller dimensions and/or smaller degree of detail than the first dimensions and/or degree of detail;
in said sender and/or receiver device, a first software module is loaded and executed, which is configured to download from the central unit the corresponding second graphic and/or audio element and to implement or use the corresponding second graphic and/or audio element thus discharged in the messaging system;
said first software module is configured to implement on a display of said sender and/or receiver device a first screen, in which a message or an exchange of messages is displayed, and in which said corresponding second graphic and/or audio element is also displayed;
said first screen has a plurality of portions, one of said portions being a balloon containing the message or the exchange of messages,
said second graphic and/or audio element, when displayed on said first screen, occupies an area of the balloon, the area of the balloon being selectable by touch, when the display is of touch-screen type, or by clicking, or through another external activation event,
at least one of said graphic elements comprises an image to be inserted within a message to be sent with said messaging system,
the first dimensions and/or degree of detail of said at least one of said graphic elements correspond to a first resolution of said image when loaded inside said database, and
the smaller dimensions and/or smaller degree of detail of said second graphic element correspond to a second resolution of said image,
said image is displayed on said first screen for displaying the exchange of messages and occupies the area selectable by the touch, when the display is of the touch-screen type, or by clicking or by the other external activation event,
said image with the second resolution is further displayed inside a typing keyboard shown on the display of the touch-screen type and is simultaneously visible on the first screen and on the typing keyboard, and
said image with the second resolution corresponds to a thumbnail version of a starting image having higher resolution and corresponding to the image stored in the central unit.

2. The messaging system according to claim 1, wherein said first software module is configured to cause said first screen to display the exchange of messages.

3. The messaging system according to claim 1, wherein:
said graphic and/or audio elements are loaded inside said database with the first dimensions and/or degree of detail, which define a first format; and
in said central unit, software is loaded and executed which is configured to create, starting from the graphic and/or audio elements in said first format, the corresponding second graphic and/or audio element in a second format different from said first format.

4. The messaging system according to claim 1, wherein said first software module is further configured to carry out operations comprising:
obtaining from said central unit a structured data packet, which has been enhanced starting from data structure generated based on a message to be sent, and identifying, within said structured data packet, a unique identification code of at least one of said graphic and/or audio elements,
when the at least one of said graphic and/or audio elements associated with said unique identification code is not already present in a local memory of the messaging system into which said first software module is in execution, the sender or receiver device requests the at least one of said graphic and/or audio elements and downloads the at least one of said graphic and/or audio elements locally in said sender or receiver device, the at least one of said graphic and/or audio elements that was downloaded locally corresponding to said second graphic and/or audio element,
based on a content of the structured data packet and the at least one of the graphic and/or audio element associated with said unique identification code, the display of the sender or receiver device, in which the first software module is running, shows the sent message also implementing said second graphic and/or audio element created by the software of said central unit.

5. The messaging system according to claim 1, wherein said first software module is configured to cause the touch or the clicking made on said area of said first screen, which is occupied by said second graphic and/or audio element, to start a corresponding action.

6. The messaging system according to claim 1, wherein said first software module is configured to cause, following the touch or the clicking or other external activation event carried out on the area of the balloon occupied by the second graphic element, to automatically start a corresponding action.

7. The messaging system according to claim 6, wherein said corresponding action provides for activating a reproduction of an audio or video element that is associated with said second graphic element.

8. The messaging system according to claim 7, wherein said corresponding action provides for automatically creating and displaying a second screen on the display of the sender or receiver device.

9. The messaging system according to claim 8, wherein, in said second screen, one second graphic element is implemented having content corresponding to content of another second graphic element and a resolution greater than a resolution of the another second graphic element.

10. The messaging system according to claim 9, wherein, in said second screen, at least the content and/or a link that had previously been associated with said one second graphic element is displayed with the resolution of the one second graphic element.

11. The messaging system according to claim 9, wherein said first software module is configured to cause the touch or the clicking or other external activation event performed on said area of the first screen, which is occupied by said second graphic and/or audio element, to automatically start the corresponding action in which, on the display where said first screen is implemented, the second screen is displayed, in which the second graphic and/or audio element occupying the selectable area is implemented with dimensions and/or degree of detail greater than dimensions and/or degree of detail of the one second graphic element.

12. The messaging system according to claim 1, wherein the software, which is loaded and/or executed in the central unit, is configured to create, starting from one of the graphic and/or audio elements that is already loaded in said database and that has said first dimensions and/or degree of detail, a corresponding graphic and/or audio element that has a same content but dimensions and/or degree of detail that are less than the first dimensions and/or degree of detail and that is defined correspondingly and dynamically based on dimensions and/or degree of detail of the display of said sender or receiver device, which requested the corresponding graphic and/or audio element from said central unit through the first software module.

13. The messaging system according to claim 1, wherein said first software module is configured to implement a procedure comprising:
the sender or the receiver device sends to the central unit, through the first software module, a request containing data on size and resolution of the display of said sender or said receiver device, in which the first software module is performed; and
the corresponding second graphic and/or audio element created by the software of the central unit is downloaded locally to said sender or said receiver device to be implemented by the said sender or said receiver device within the messaging system.

14. The messaging system according to claim 13, wherein said first software module is configured to carry out said procedure to create the corresponding second graphic and/or audio element occupying the area, selectable by the touch or the clicking, implemented within the first screen for displaying the exchange of messages.

15. The messaging system according to claim 13, wherein said first software module is configured to carry out said procedure to create the corresponding second graphic and/or audio element, which has dimensions and/or degree of detail and which is implemented within said second screen.

16. The messaging system according to claim 1, wherein the software loaded and/or executed in the central unit is configured to automatically create the corresponding second graphic and/or audio element having dimensions and/or degree of detail and/or format, which are lower than the first dimensions and/or degree of detail of the graphic and/or audio elements, when the graphic and/or audio elements are loaded into said database of said central unit or into a second database.

* * * * *